US012172429B2

(12) United States Patent
Wu

(10) Patent No.: US 12,172,429 B2
(45) Date of Patent: Dec. 24, 2024

(54) SUBSTRATE ORIENTATION DEVICE FOR LIQUID DISPENSING OPERATIONS

(71) Applicant: Agilent Technologies, Inc., Santa Clara, CA (US)

(72) Inventor: Andy Wu, Millbrae, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 175 days.

(21) Appl. No.: 18/105,110

(22) Filed: Feb. 2, 2023

(65) Prior Publication Data

US 2024/0262112 A1 Aug. 8, 2024

(51) Int. Cl.
*B41J 11/42* (2006.01)
*B01L 3/00* (2006.01)

(52) U.S. Cl.
CPC ......... *B41J 11/42* (2013.01); *B01L 3/502707* (2013.01); *B01L 2200/12* (2013.01); *B01L 2300/0819* (2013.01)

(58) Field of Classification Search
CPC ................ B41J 11/42; B01L 3/502707; B01L 2200/12
See application file for complete search history.

(56) References Cited

U.S. PATENT DOCUMENTS

| | | | |
|---|---|---|---|
| 8,778,849 | B2 | 7/2014 | Bowen et al. |
| 2008/0206850 | A1 | 8/2008 | Dellinger et al. |
| 2022/0155677 | A1 | 5/2022 | Cone et al. |

FOREIGN PATENT DOCUMENTS

| | | | | |
|---|---|---|---|---|
| CA | 2543091 C | * | 9/2013 | ............ B01L 3/0244 |
| JP | 2006510226 A | | 3/2006 | |
| JP | 2022043554 A | | 3/2022 | |
| KR | 200343820 Y1 | | 3/2004 | |
| KR | 20110137078 A | | 12/2011 | |
| WO | WO-2013063382 A2 | * | 5/2013 | .......... B01J 19/0046 |

OTHER PUBLICATIONS

Lausted et al., POSaM: a fast, flexible, open-source, inkjet oligonucleotide synthesizer and microarrayer, Genome Biology, vol. 5, Issue 8, Article R58 (2004); 17 pages.
Dufva, Fabrication of high quality microarrays, Biomolecular Engineering (2005); 12 pages.
Barbulovic-Nad et al., Bio-Microarray Fabrication—A Review, Critical Reviews in Biotechnology, 26:237-259 (2006); 24 pages.
PCT International Search Report and Written Opinion dated May 13, 2024 for Application No. PCT/US2024/011652; 8 Pages.

* cited by examiner

*Primary Examiner* — Sharon Polk

(57) ABSTRACT

A substrate orientation device includes a frame that supports a substrate on which liquid is dispensed, for example as may relate to (bio)chemical microarray fabrication. The frame is movable to different positions, such as for mounting the substrate to the frame, depositing droplets on the substrate, and applying a bulk liquid to the substrate. The substrate orientation device may be movable to different locations, such as different liquid dispensing devices, for example a printer and a flow cell.

20 Claims, 11 Drawing Sheets

SUBSTRATE ORIENTATION DEVICE FOR LIQUID DISPENSING OPERATIONS

TECHNICAL FIELD

The present invention generally relates to liquid dispensing operations, such as may be part of the fabrication of microarrays, for example nucleic acid microarrays, and which may include droplet deposition on a substrate and a separate application of a bulk liquid to the substrate. In particular, the invention relates to a device that orients and reorients the substrate to different positions as part of one or more liquid dispensing operations.

BACKGROUND

Liquid dispensing operations, such as for microarray fabrication, may involve the use of a liquid dispensing device such as a printer (e.g., an inkjet printer) to deposit liquid droplets onto selected sites on a substrate such as a glass slide to create (or add material to) a (typically two-dimensional) array of spots on the substrate. Depending on the application, the spots may be sites for carrying out chemical or biochemical reactions or synthesis (e.g., of nucleotides, proteins, etc.), and/or analysis of one or more components or features of the spots. One example of microarray fabrication deposits droplets of nucleoside phosphoramidites in solvent onto the substrate as part of the synthesis of biomolecules (e.g., nucleic acids). Afterwards, the substrate surface on which the spots are located may be post-processed in a flow cell module, which is separate from the printer. In the flow cell module, one or more bulk fluids are washed over the substrate surface as needed to prepare the substrate surface for the next iteration of printing (e.g., to extend oligonucleotides on the substrate surface). In other words, after processing in the flow cell module, the substrate may be returned to the printer, after which additional droplets may be deposited on the pre-existing spots on which other droplets were previously dispensed. The separate steps of printing and flow cell processing may be repeated any number of times, depending on the application.

In a known microarray fabrication system, the substrate is mounted horizontally on a substrate holder, which in turn is mounted on an X-Y stage. The horizontal orientation is optimal for printing as it facilitates accuracy, precision, homogeneity, and repeatability in the process of printing droplets onto predesignated addresses the substrate surface. The X-Y stage then moves the substrate underneath the jets of an inkjet printer. After printing has been completed, the X-Y stage moves the substrate to a swap station where a robotic arm with a substrate gripper is located. The robotic arm then picks up the substrate from the substrate holder and transfers the substrate to a different substrate holder of a flow cell module. At the flow cell module, the substrate is held in a vertical position at which the spots face the interior space of a flow cell. The vertical orientation is optimal for fluidic operations in the flow cell, such as achieving uniform fluid flow and promoting the purging of bubbles from the liquids in the flow cell.

The known system is disadvantageous for a number of reasons. The known system requires the use of a complex, precision robotic arm and a swap station to execute the transfer of the substrate to the flow cell module. The robotic arm may accidentally drop and break a substrate. Further, the known system requires the use of more than one substrate holder, and complex camera/machine vision hardware to ensure precise, accurate reorientation and realignment of the substrate at the horizontal and vertical positions. In the known system, the substrate must be accurately and precisely realigned every time the substrate is removed and repositioned during each printing and flow cell processing cycle. The multiple steps required for manipulating (moving/removing, positioning/repositioning, aligning/realigning) the substrate may result in errors in the manipulations stacking up.

Therefore, there is an ongoing need for further developments in devices, systems, and methods relating to liquid dispensing operations such as may be part of microarray fabrication.

SUMMARY

To address the foregoing needs, in whole or in part, and/or other needs that may have been observed by persons skilled in the art, the present disclosure provides methods, processes, systems, apparatus, instruments, and/or devices, as described by way of example in implementations set forth below.

According to an implementation, a substrate orientation device, for orienting a substrate configured as a solid support for liquid dispensing, includes: a base; and a frame configured to support the substrate and to move relative to the base to a first position and to a second position, wherein: at the first position, the frame is substantially parallel with the base; and at the second position, the frame is oriented at an angle to the base.

According to another implementation, a liquid dispensing system includes: a substrate orientation device according to any of the implementations disclosed herein; and a liquid dispensing device configured to dispense a liquid on the substrate while the substrate is supported by the frame.

According to another implementation, a method for dispensing liquid on a substrate includes: providing a substrate orientation device according to any of the implementations disclosed herein; mounting the substrate to a frame of the substrate orientation device; moving the frame to a first position; moving the frame to a second position; and, before or after moving the frame to the first position and to the second position, dispensing a liquid onto the substrate.

According to another implementation, a method for dispensing liquid on a substrate includes: providing a substrate orientation device comprising a base and a frame configured to support the substrate; mounting the substrate to the frame; moving the frame relative to the base to a first position at which the frame is substantially parallel with the base; moving the frame relative to the base to a second position at which the frame is oriented at an angle to the base; and before or after moving the frame to the first position and to the second position, dispensing a liquid on the substrate.

According to another implementation, a non-transitory computer-readable medium includes instructions stored thereon, that when executed on a processor, control or perform one or more of the steps of any of the methods disclosed herein.

According to another implementation, a liquid dispensing system includes the non-transitory computer-readable storage medium.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

Figure 1:
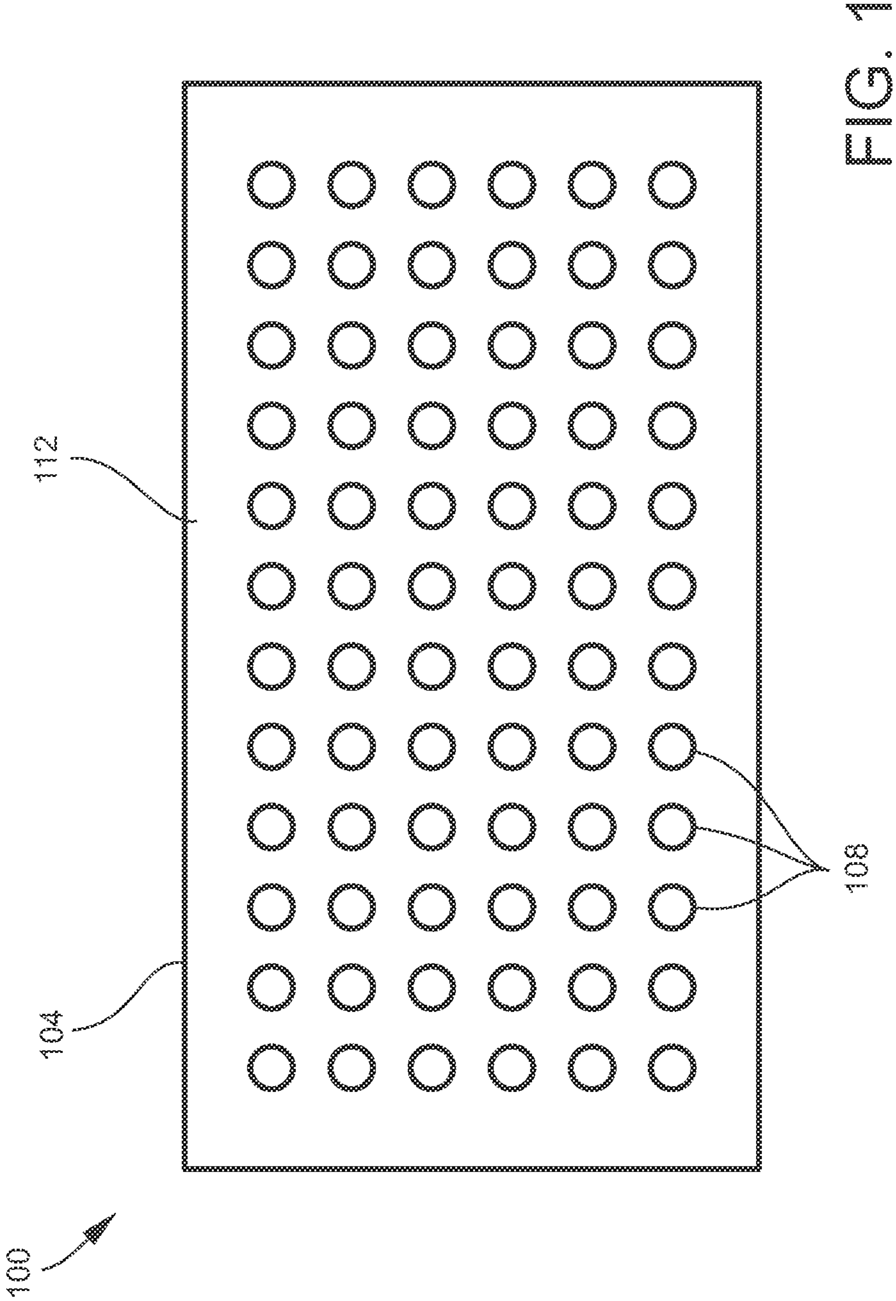
FIG. 1 is a top plan view of an example of a microarray according to an implementation of the present disclosure.

The illustrations in all of the drawing figures are considered to be schematic, unless specifically indicated otherwise.

DETAILED DESCRIPTION

In this disclosure, all “implementations,” “aspects,” “examples,” and “embodiments” described are considered to be non-limiting and non-exclusive. Accordingly, the fact that a specific “implementation.” “aspect.” “example,” or “embodiment” is explicitly described herein does not exclude other “implementations,” “aspects,” “examples,” and “embodiments” from the scope of the present disclosure even if not explicitly described. In this disclosure, the terms “implementations,” “aspect,” “example,” and “embodiment” are used interchangeably, i.e., are considered to have interchangeable meanings.

In this disclosure, the term “substantially.” “approximately.” or “about,” when modifying a specified numerical value, may be taken to encompass a range of values that include +/−10% of such numerical value, unless specifically indicated otherwise.

In this disclosure, the term “liquid” encompasses a single liquid-phase composition or a mixture or blend of two or more liquid-phase compositions. Examples of a liquid include, but are not limited to, a solution, a suspension, a colloid, or an emulsion. A liquid may contain or carry solid particles (e.g., inorganic particulates, whole biological cells or lysed cell components, etc.) and/or gas or vapor bubbles.

In this disclosure, the term “(bio)chemical compound” encompasses chemical compounds and biological compounds (or biomolecules). A chemical compound may be, for example, a small molecule or a high molecular-weight molecule (e.g., a polymer, etc.). A biological compound may be, for example, a biopolymer. Examples include, but are not limited to, nucleic acids (or polynucleotides), such as deoxyribonucleotides, ribonucleotides, oligonucleotides (or “oligos”), proteins, carbohydrates, sugars, lipids, and analogs or derivatives of the foregoing.

In this disclosure, the term “interaction” generally refers to an interaction between two or more components, where the components taking part in the interaction may be one or more elements, one or more molecules, or a combination of one or more elements and one or more molecules. The term “interaction” encompasses (bio)chemical reactions, including (bio)chemical synthesis.

FIG. 1 is a top plan view of an example of an array (or microarray) 100 that may be fabricated by devices, systems and methods described in the present disclosure. The microarray 100 may be configured for various applications in fields such as, for example, immunoassays, genomics, proteomics, metabolomics, cell analysis, disease diagnosis or other disease analysis or prediction, drug discovery, combinatorial chemistry, etc. Alternatively, the molecules synthesized as the microarray 100 may be cleaved or removed wholly or in part from the substrate 104 and used for various applications in the fields listed above. The microarray 100 includes a solid substrate 104, and a one-dimensional (1D) or (more typically) two-dimensional (2D) array of spots 108 (or features, liquid deposition sites, “virtual wells,” physical depressions, elevated regions, etc.) disposed on a top surface (or substrate surface) 112 of the substrate 104. The spots 108 may correspond to discrete, individually identifiable locations on the top surface 112. Moreover, the spots 108 may be individually addressable (e.g., assignable to individual (X-Y) coordinates), discernable and locatable by appropriate instrumentation such as a camera or other type of sensor.

The substrate 104 is configured as a solid support for liquid dispensing operations, which may be part of microarray fabrication as noted above. That is, the substrate 104 (or at least its top surface 112, or at least the sites to be in contact with the spots 108) may be composed of any solid material suitable for serving as a solid support for the (bio)chemical interactions carried out at the sites of the spots 108, which interactions are application-dependent. As one example, the (bio)chemical reactions may be part of deoxyribonucleic acid (DNA) or ribonucleic acid (RNA) synthesis. Examples of the material of the substrate 104 include, but are not limited to, various glasses, quartz or fused silica, polymer-coated glasses, polymers (e.g., poly(methyl methacrylate) or PMMA, polydimethylsiloxane or PDMS, an epoxy-based polymer such as SU-8, etc.), ceramics, and silicon. The top surface 112 of the substrate 104 (or at least the sites to be in contact with the spots 108) may be derivatized/functionalized/modified as needed for a particular application, as appreciated by persons skilled in the art. For example, the substrate 104 may be pretreated to render the top surface 112 (or at least the sites to be in contact with the spots 108) hydrophobic and thereby optimize the formation of uniform or homogeneous spots 108. For example, after dispensed droplets contact designated spots 108 on the top surface 112, the droplets may be uniformly sized and maintain a substantially hemispherical or domed shape. Silanized glass is one example of a pretreated substrate 104. As another example, a substrate 104 may be pretreated in the sense that spots 108 are initially formed with a starting material (e.g., a biochemical probe, a pad configured to facilitate oligonucleotide extension, etc.) prior to implementation of any of the liquid dispensing methods disclosed herein.

The substrate 104 is typically (but not necessarily) planar or plate-shaped, meaning that the thickness (in the direction of the drawing sheet) of the substrate 104 is the smallest physical dimension in comparison to the length and width of the substrate 104 in the horizontal plane shown in FIG. 1. As such, in various implementations, the substrate may be characterized as plate, slide, chip, etc. The substrate 104 is typically (but not necessarily) rectilinear, as shown in FIG. 1.

In the present example, the top surface 112 of the substrate 104 is a flat, continuous surface and the spots 108 define (or are located at) respective virtual wells as opposed to actual, structurally distinct wells formed in the substrate 104. In other implementations, however, the substrate 104 may include depressions or actual wells (e.g., like a microplate) that serve as individually addressable sites for receiving dispensed droplets. In other words, the spots 108 may be located in actual wells of the substrate 104. Alternatively, the spots 108 may define (or be located at) respective raised features that serve as individually addressable sites for receiving dispensed droplets.

The composition of the spots 108 depends on the application being implemented and the current stage or step of the application being implemented. For example, prior to performing a given step of droplet deposition onto the spots 108, the spots 108 may be "empty" locations on the top surface 112, i.e., not containing any material. As another example, prior to performing a given step of droplet deposition onto the spots 108, the spots 108 may contain functional groups and/or one or more partially or wholly dried materials. After performing a given step of droplet deposition onto the spots 108 (or onto a selected subset of spots 108 of the overall array of spots 108), the spots 108 contain the droplets (i.e., the material that is part of the droplets that were dispensed). At a given instance of time, the droplet material on the spots 108 may be partially or wholly dried depending on the degree of evaporation that has occurred. At a given instance of time, the spots 108 may contain the product of one or more (bio)chemical interactions that have been carried out during the process of microarray fabrication. For example, in the case of DNA or RNA microarray fabrication, the spots 108 may be or include DNA or RNA probes immobilized on the top surface 112 (or at least the sites of the spots 108 on the top surface 112) of the substrate 104, and target molecules bound to the DNA or RNA probes. Protein-based arrays may also be fabricated by application of the subject matter disclosed herein, such as for analyzing protein-protein or protein-ligand interactions. As another example, the spots 108 may be or include the results of non-biological chemical reactions, synthesis, or other type of interaction between non-biological chemical compounds. More generally, the composition of the spots 108 may vary during a liquid dispensing or array fabrication process. For example, the composition of the spots 108 may differ at different, intermediate stages of an array fabrication process. Depending on the stage of an array fabrication process, the spots 108 may or may not be dry at the time a particular liquid dispensing step is performed.

The number of rows and columns of spots 108 and total number of spots 108 shown in FIG. 1 are merely illustrative. As examples, the number of spots 108 may range from a few (e.g., 10) to one hundred or a few hundred (e.g., for diagnostic applications), or to hundreds of thousands or several million (e.g., for high-throughput research or screening applications). The spacing between adjacent spots 108 is typically uniform throughout the array although this is not a requirement. The spacing between adjacent spots 108 is typically large enough to avoid cross-contamination between or merging of adjacent spots 108, and to enable the spots 108 to be spatially discrete and individually identifiable (e.g., individually addressable by detection/imaging technology). As examples, the volume of a droplet deposited on the substrate 104 may be on the order of picoliters (pL) (e.g., in a range from 1 or a few pL to 1000 pL) or nanoliters (nL) (e.g., in a range from 1 or a few nL to 1000 nL), the diameter of a spot 108 on the substrate 104 after receiving a droplet and the spacing between adjacent spots 108 may be on the order of micrometers (μl) (e.g., in a range from 1 or a few μm to 1000 μm), and the density of the spots 108 in the microarray 100 may be on the order of a few thousand, tens of thousands, or several hundred thousands of spots per square centimeter ($cm^2$). The constructed microarray 100 may be used as a means to fabricate individual or libraries of molecules which may be subsequently used as a microarray or wholly or partially cleaved from the surface 112.

Examples of microarray fabrication are described in, for example, U.S. Patent App. Pub. No. 2008/0206850; U.S. Pat. No. 8,778,849; Lausted et al., *POSaM: a fast, flexible, open-source, inkjet oligonucleotide synthesizer and microarrayer*, Genome Biology, Vol. 5, Issue 8, Article R58 (2004); Dufva, *Fabrication of high quality microarrays*, Biomolecular Engineering (2005); and Barbulovic-Nad et al., *Bio-Microarray Fabrication—A Review*, Critical Reviews in Biotechnology, 26:237-259 (2006); the entire contents of each of the foregoing being incorporated by reference herein.

Figure 2A:
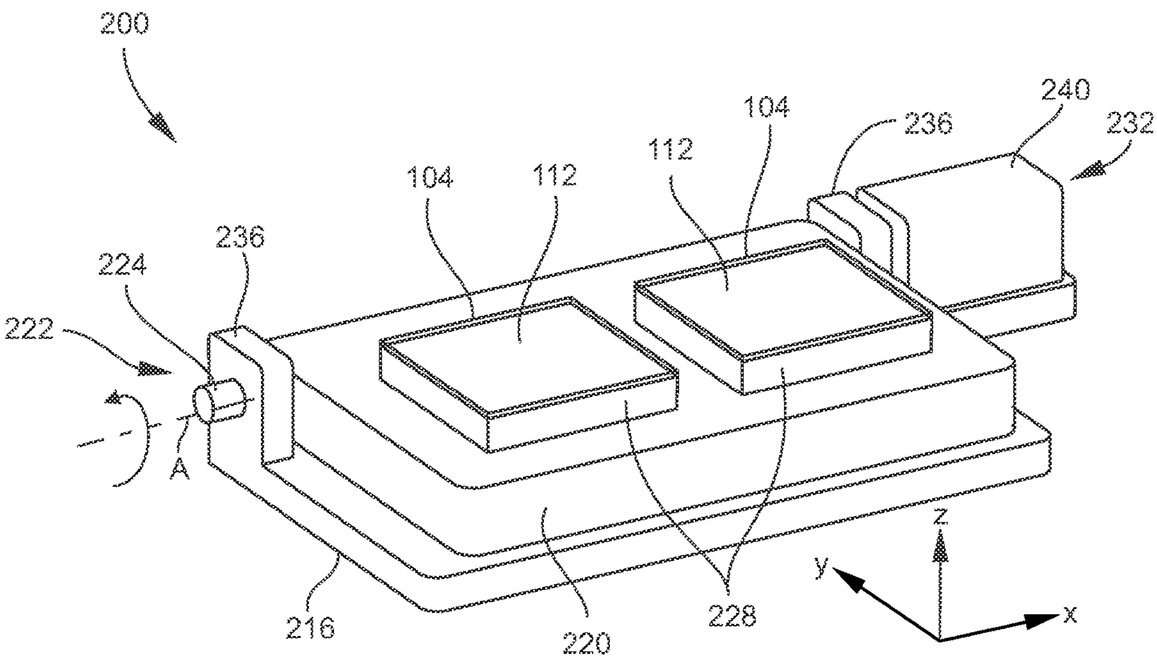
FIG. 2A is a perspective view of an example of a substrate orientation device according to an implementation of the present disclosure, showing the substrate orientation device at a first position.
Figure 2B:
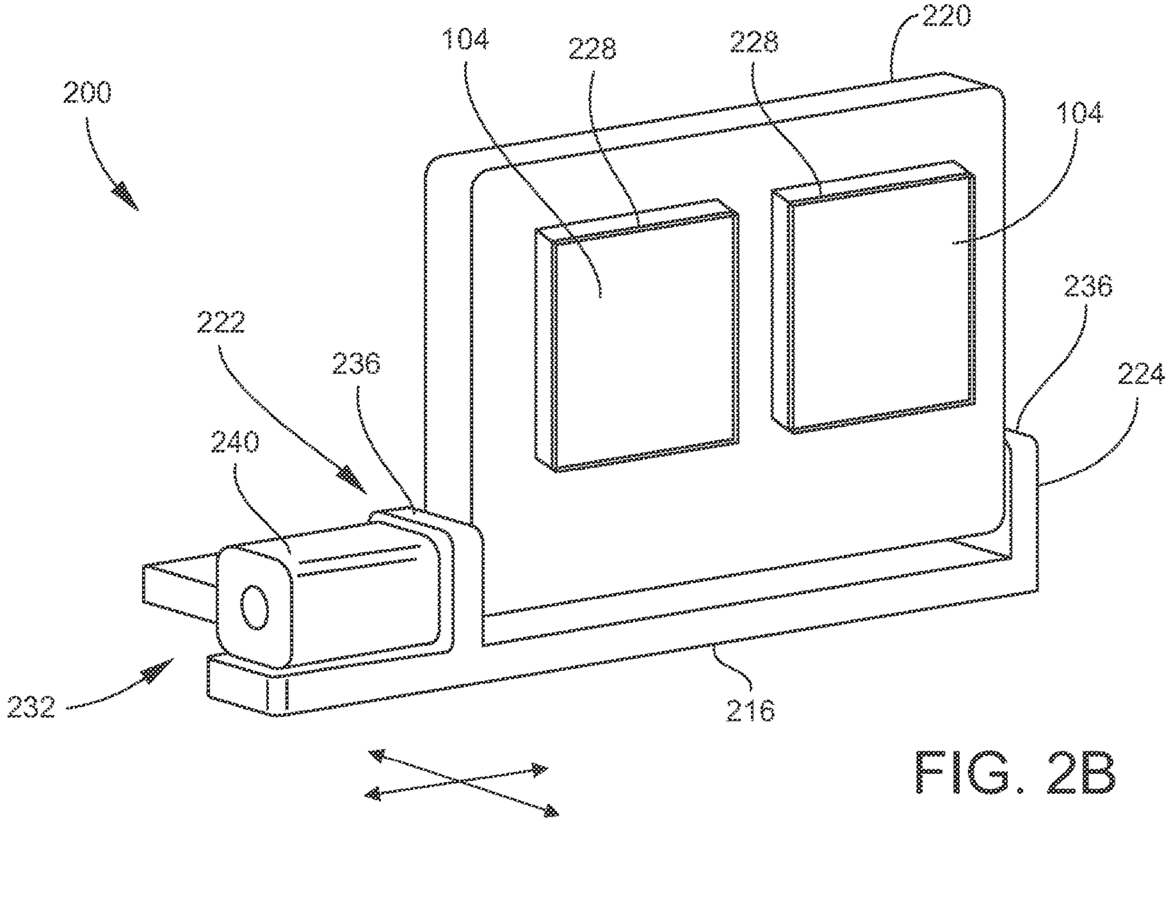
FIG. 2B is a perspective view of the substrate orientation device illustrated in FIG. 2A, rotated about 180 degrees relative to FIG. 2A, showing the substrate orientation device oriented at a second position.
Figure 2C:
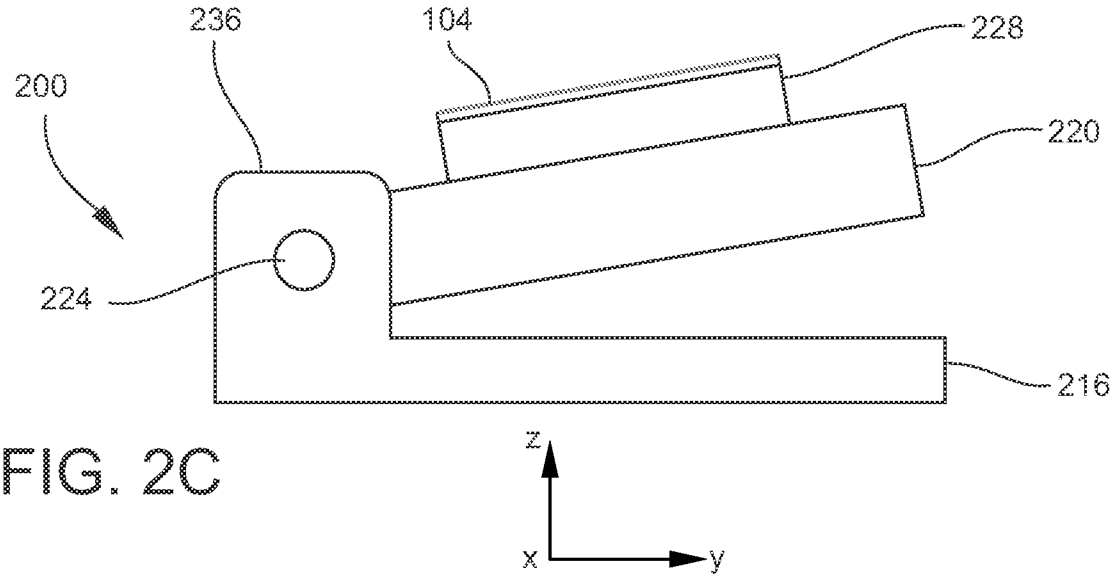
FIG. 2C is a side view of the substrate orientation device illustrated in FIG. 2A, showing the substrate orientation device oriented at an additional position that is different from the first and second positions, according to an implementation of the present disclosure.

FIGS. 2A-2C illustrate an example of a substrate orientation device 200 according to an implementation of the present disclosure. Specifically, FIG. 2A is a perspective view of the substrate orientation device 200 while at a first position, FIG. 2B is a perspective view of the substrate orientation device 200 while at a second position that is different from the first position, and FIG. 2C is a side view of the substrate orientation device while at an additional position that is different from the first and second positions. For purposes of description, FIG. 2A (and certain other drawing figures) includes an arbitrarily located Cartesian coordinate (X-Y-Z) frame of reference. The X-axis and the Y-axis are taken as lying in a horizontal (X-Y) plane, which may correspond to any ground area or other surface (e.g., bench, table, floor, instrument deck, etc.) on which the substrate orientation device 200 rests, is attached, or is otherwise supported. The Z-axis is thus taken as corresponding to the vertical direction. The dimensions of the X-axis, Y-axis, and Z-axis (such as may relate to the substrate orientation device 200 or any of its components) are taken to be length, width, and height, respectively. The view of FIG. 2B is rotated 180 degrees or so about the Z-axis relative to FIG. 2A.

In the illustrated example, the substrate orientation device 200 includes a base 216 and a frame 220 that is configured to support one or more substrates 104 (two substrates 104 in the illustrated example). The base 216 and the frame 220 may be generally planar structural members (e.g., plates) composed of any suitably rigid material (e.g., various metals, metal alloys, hard plastics, etc.). The base 216 may serve as a main structural support for the rest of the substrate orientation device 200. In one implementation, the base 216 is also configured to be mounted to a movable stage, as described below. In the illustrated example, the substrate orientation device 200 also includes one or more substrate holders 228, which may be attached to the frame 220 or an integral part of the frame 220. For example, the frame 220 and the substrate holder(s) 228 may include mounting features (not shown; e.g., mounting/alignment pins and corresponding mounting/alignment holes, clamps, other types of fixture components, etc.) configured to engage each other to enable the substrate holders 228 to be securely fixed to the frame 220. Thus, the substrate holders 228 may be removably mounted to the frame 220. Alternatively, the substrate holders 228 may be permanently attached, or integral with, the frame 220. In the latter case, the frame 220 and substrate holders 228 may be considered to be the same component. In any case, the substrate(s) 104 are considered to be supportable by or mountable on the frame 220 either directly or indirectly (through the use of distinct substrate holders 228).

The frame 220, or each substrate holder 228 if provided, is configured to hold a substrate 104 in a secure and repeatable position on the top side of the frame 220 or substrate holder 228. For this purpose, the frame 220 or substrate holder 228 may include appropriate mechanical mounting features (e.g., clamps, pins, adhesive, etc.). Alternatively or additionally, the frame 220 or substrate holder 228 may be or include a vacuum chuck configured to hold the substrate 104 by application of a vacuum at the underside of the substrate 104. In the latter case, the frame 220 or substrate holder 228 may communicate with a suitable vacuum source such as a vacuum pump of any suitable type (not shown).

The frame 220 (and thus the substrate(s) 104 when supported on the frame 220, as well as distinct substrate holder(s) 228, if any) is also configured to move relative to the base 216 between (and to) various positions. For example, FIG. 2A shows the frame 220 in a first position that is parallel or substantially parallel with the base 216, and FIG. 2B shows the frame 220 in a second position that is oriented at an angle to the base 216. Considering the base 216 as being oriented in the X-Y plane at zero degrees relative to a plane defined in part by the Z-axis, the term "substantially parallel" may be taken to mean that at the first position, the frame 220 is oriented at zero degrees+/−ten degrees. In the illustrated example, at the second position, the frame 220 is substantially perpendicular to the base 216, i.e., lying in the X-Z plane ninety degrees relative to the X-Y plane. The term "substantially perpendicular" may be taken to mean that at the second position, the frame 220 is oriented at ninety degrees+/−ten degrees relative to the first position, or the base 216, or the X-Y plane. Thus, in this example, the first position is a horizontal position, and the second position is a vertical position. As noted above in the Background section, the horizontal orientation is optimal for printing (or other type of droplet deposition), and the vertical orientation is optimal for bulk fluidic operations in a flow cell.

In the present implementation, the frame 220 is configured to move to and among (e.g., between) various positions, including to the first position illustrated in FIG. 2A and to the second position illustrated in FIG. 2B. The frame 220 also may be configured to move between the first position and the second position. The frame 220 also may be configured to move to additional positions. Depending on the sequence of movements required by a given application, one or more "additional" positions may be intermediate positions relative to the illustrated first and second positions. For example, an additional, intermediate position may be one that is oriented at an angle to the first position and the second position. One such additional or intermediate position is shown in FIG. 2C. Generally, movements to and between various positions may involve rotation about one or more axes, linear translation along one or more axes, or a combination of both. In the illustrated example, the substrate orientation device 200 is configured as a hinge, whereby the frame 220 (and any components supported thereby, such as the illustrated substrates 104 and substrate holders 228) is rotatable relative to the base 216 to and between one or more positions. In the illustrated example, the substrate orientation device 200 is configured to "flip" the frame 220 from the first position to the second position, and alternately from the second position to the first position. Examples of available positions in addition to the first position shown in FIG. 2A and the second position shown in FIG. 2B are described with reference to FIGS. 2C and 4A-6. Moreover, as indicated by arrows in FIG. 2B and as further described below, the (e.g., entire) substrate orientation device 200 may be movable along one or more (typically horizontal) axes such as the X-axis or both the X- and Y-axes.

In various implementations, the first position shown in FIG. 2A may be considered to be a liquid dispensing position at which liquid is dispensed on the substrate(s) 104, as described below in conjunction with FIG. 3. The first position may also be considered to be a substrate mounting position at which the substrate(s) 104 are mounted to the frame 220 (or directly to substrate holder(s) 228 if provided). Alternatively, an additional position oriented at an angle to the first position may be utilized as a substrate mounting position, as shown in FIG. 2C. The second position shown in FIG. 2B may be considered to be an open cell position or a closed cell position, and the closed cell position may be considered to be a liquid dispensing position, as described below in conjunction with FIGS. 4A and 4B.

Generally, the substrate orientation device 200 may have any configuration suitable for allowing the frame 220 to move relative to the base 216. In one implementation, illustrated in FIGS. 2A and 2B, the substrate orientation device 200 includes a coupling device 222 configured to couple the frame 220 to the base 216. In the illustrated example, the coupling device 222 includes an axle (or pin, rod, etc.) 224 that is rotatably mounted by one or more axle supports 236. The axle 224 has at least one degree of freedom, which is rotation about its axis of rotation (or pivot axis) A, which in this example corresponds to (or is parallel to) the X-axis. In this example, the frame 220 and the axle 224 are rotatable together about the axis of rotation A relative to the (stationary) base 216, as depicted by a curved arrow in FIG. 2A. The axle supports 236 may be attached to or integral with the frame 220 and/or the base 216. In the illustrated example, the axle 224 extends into or through a hole of each axle support 236. In the illustrated example, at least a portion of the frame 220 is located at the pivot axis A and is interposed between two axle supports. The axle supports 236 may be or include bearings of an appropriate type (e.g., plain bearings, ball bearings, needle bearings, air bearings, magnetic bearings, etc.) as appreciated by persons skilled in the art.

In another implementation (not shown), the axle 224 may be divided into two or more axle segments, and each axle segment is supported by a corresponding axle support. In another implementation, the axle 224 may be stationary (not rotatable), and the axle supports 236 may be attached to or integral with the frame 220 and be rotatable about the axle 224. More generally, the axle 224 and the axle support(s) 236 may be positioned anywhere on or in the substrate orientation device 200 for effectively enabling the frame 220 (and any components supported thereby, such as the illustrated substrates 104 and substrate holders 228) to be rotatable relative to the base 216.

In one implementation, illustrated in FIGS. 2A and 2B, the substrate orientation device 200 further includes an actuator 232. In one implementation, in addition to coupling the frame 220 and the base 216, the coupling device 222 may be configured to couple the actuator 232 and the frame 220 and/or base 216. Alternatively, a separate coupling device (not shown) may be provided for coupling the actuator 232 and the frame 220 and/or base 216. Generally, the actuator 232 may have any configuration suitable for driving the movement of the frame 220, via the coupling device 222 in the present example. In the present example, the actuator 232 includes a suitable motor 240 (e.g., an electric stepper motor or servo motor) that is mechanically coupled to the axle 224 (or, alternatively to the axle support(s) 236 if the axle support(s) 236 are movable and the axle 224 is stationary). The actuator 232 may include an appropriate mechanical linkage or linkage assembly as needed to transfer the motive power generated by the motor 240 to the frame 220. This power transfer may involve one or more conversions of one type of motion (e.g., rotation, linear translation, etc.) to another type of motion, as appreciated by persons skilled in the art. Depending on the implementation, the axle 224 and/or the axle support(s) 236 may be considered as being part of the mechanical linkage. The mechanical linkage may include other types of components such as rotary and/or linear guides, rotary and/or linear bearings, toothed components, cams and cam followers, etc., as appreciated by persons skilled in the art.

As alternatives to an electrically powered motor, the motor 240 may be a pneumatic or hydraulic device, as appreciated by persons skilled in the art. As another alternative, movement of the frame 220 may be performed by a manual operation. For example, the actuator 232 may include a handle or lever (not shown) manipulable by a user of the substrate orientation device 200. The user-operated handle may be in addition to the motor 240. For example, the substrate orientation device 200 may be configured to allow the user to disengage the powered operation of the motor 240 and thereby instead allow use of the handle to drive motion of the frame 220.

Figure 3:
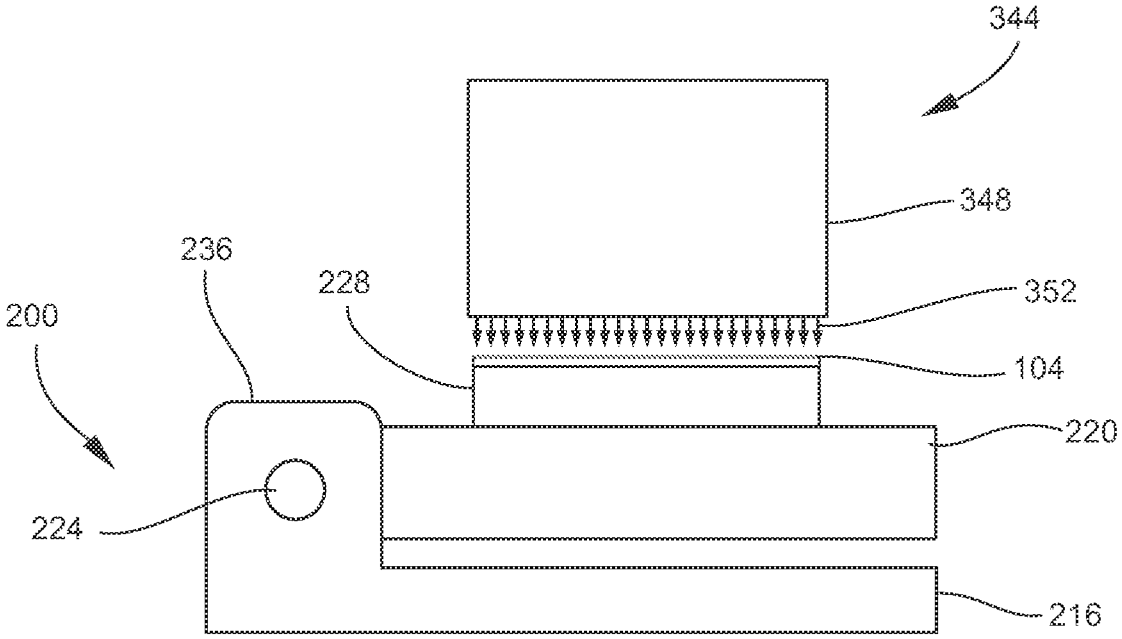
FIG. 3 is a side view of the substrate orientation device oriented at the first position illustrated in FIG. 2A and located at a printing station, according to an implementation of the present disclosure.

FIG. 3 is a side view of the substrate orientation device 200 at the first position (i.e., the frame 220 is located at the first position, along with any components supported thereby, such as the substrate(s) 104 and substrate holder(s) 228, if any, as shown in FIG. 2A) and located at a liquid dispensing station according to an implementation of the present disclosure. A liquid dispensing device 334 is located at the liquid dispensing station. In the present example, the liquid dispensing station is a printer station, and the liquid dispensing device 334 is a printer (module or assembly). The liquid dispensing device 334 as a printer includes a multi-channel print head assembly 348 that supports a plurality of printing elements 352 (e.g., nozzles, pins, stamps, etc.). The printing elements 352 are configured to dispense liquid by depositing droplets on predetermined addresses or spot sites on the substrate(s) 104. The liquid dispensing device 334 may also include one or more liquid reservoirs (not shown) for supplying one or more bulk liquids, and one or more liquid flow devices (not shown) and associated liquid conduits needed for flowing one or more liquids from the liquid reservoirs to and through the printing elements 352. Depending on the implementation, such liquid reservoirs and liquid flow devices may be external or internal to the schematically illustrated liquid dispensing device 334.

In FIG. 3, the substrate orientation device 200, and particularly the substrate 104, is located at the first position (after movement from another position, if necessary) and has been moved directly underneath the printing elements 352. The vertical gap distance between the printing elements 352 and the top surface (112, see FIGS. 1 and 2A) of the substrate 104 may be, for example, on the order of microns (e.g., in a range from a few μm up to 1000 μm). The gap distance may be adjustable (e.g., by providing for vertical adjustment of the print head assembly 348 or the substrate orientation device 200) or may not be adjustable. In an application that does not require all droplets to be printed on the entire array of predesignated spot sites simultaneously, the array of printing elements 352 may be smaller than the total array of spot sites. In this case, the print head assembly 348 or the substrate orientation device 200 may be configured to be moved along one or more axes, and multiple printing jobs may be executed, until the entire array of droplets has been printed on the array of spot sites on the substrate 104. Alternatively, the printing elements 352 may be arranged in a 2D array having a size (total number of printing elements 352, and number of rows and columns of printing elements 352) and an element-to-element spacing that matches the size and spacing of the spots of the substrate 104 on which the droplets are to be printed (or "written") (see description above relating to FIG. 1), whereby a given step of droplet printing of a particular material does not require movement of the print head assembly 348 or the substrate orientation device 200 relative to the other.

In one implementation, the substrate orientation device 200, and particularly the substrate 104, is positioned under the printing elements 352 in an accurate and highly repeatable manner. This is particularly important for drop-on-drop accuracy, or drop-on-spot accuracy, e.g., in microarray fabrication processes that require multiple printing steps that require droplets to be accurately printed directly on top of the same spot sites where other droplets were previously printed (and may have already dried out due to evaporation, or substantially removed by a bulk fluid process such as may be performed at a flow cell, see description below with reference to FIGS. 4A and 4B). In one implementation, positional accuracy and repeatability is achieved by mounting the substrate orientation device 200 to a precision movable stage, as described below.

Generally, no limitation is placed on the type of liquid dispensing device 344 utilized, or the type of liquids deposited by the liquid dispensing device 344, in conjunction with the substrate orientation device 200 and other devices and systems disclosed herein. The type of liquid dispensing device 344 utilized may depend at least in part on the type of liquid dispensing (e.g., microarray fabrication) technique being implemented. Examples of categories or classes of microarray fabrication techniques include, but are not limited to, techniques employing non-contact printing, contact printing, and printing as part of in situ (de novo) synthesis of microarrays, as appreciated by persons skilled in the art. At the time the substrate 104 is initially positioned at the liquid dispensing device 344 for performing droplet deposition, the spots 108 on the substrate 104 may or may not already include pre-attached or pre-synthesized (bio)molecules or other chemistry. In the present example, the liquid dispensing device 344 is configured for non-contact printing, in which case the printing elements 352 may be inkjet elements that deposit droplets to build an array of spots 108 on the substrate 104 (FIG. 1). In this case, for example, the printing (or writing) operations may be based on an appropriate technique, now known or later developed, which is based on phosphoramidite chemistry. Thus, one example of a liquid dispensed by the liquid dispensing device 344 is a solution containing one or more types of nucleoside phosphoramidites. Also in this case, the print head assembly 348 may include liquid reservoirs containing the liquids to be dispensed, liquid flow devices (liquid moving components, such as pumps, thermal elements, piezoelectric elements, etc.), and associated liquid conduits as needed to dispense controlled amounts of the liquids from the printing elements 352 onto the substrate 104. Alternatively, bubble-jet printing technology may be utilized. In the alternative case of contact printing, the printing elements 352 may be solid pins, slotted pins, micro-stamps, etc. as appreciated by persons skilled in the art. Contact printing may require that the printer 344 be movable to a separate liquid reservoir to enable contact-type printing elements to pick up the liquids to be dispensed.

Figure 4A:
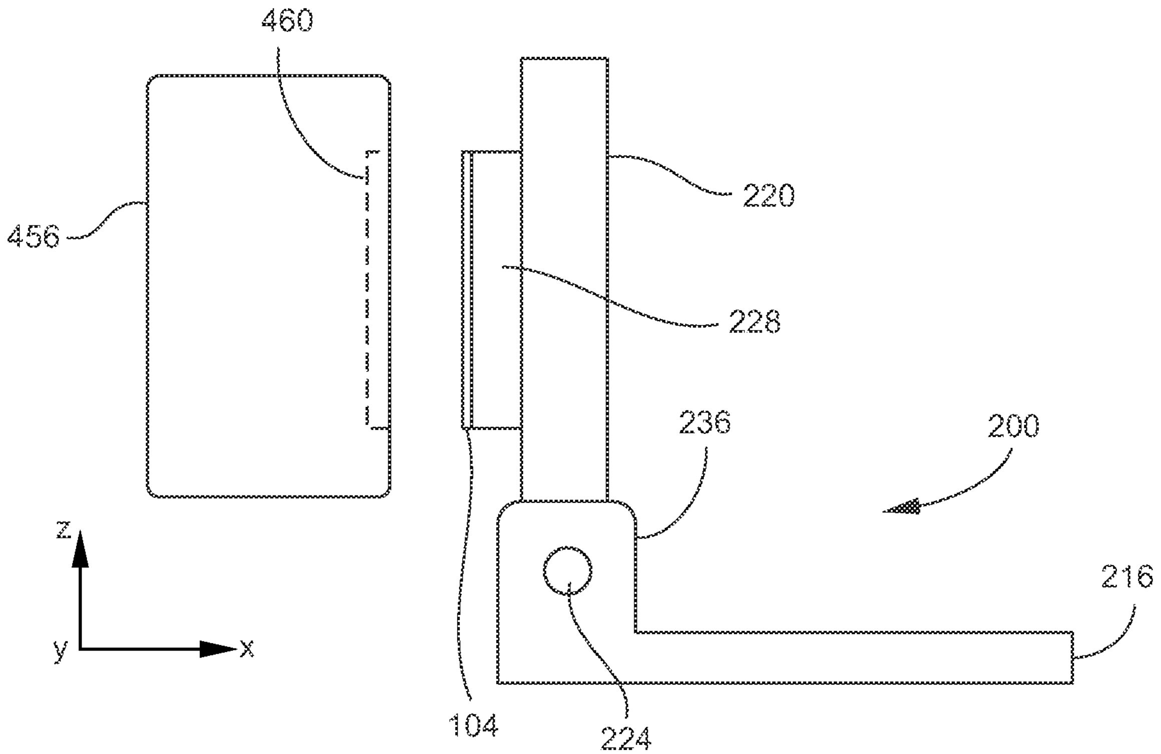
FIG. 4A is a side view of the substrate orientation device oriented at an open flow cell position and located at a flow cell station, according to an implementation of the present disclosure.

FIG. 4A is a side view of the substrate orientation device 200 (i.e., the frame 220 along with any components supported thereby, such as the substrate(s) 104 and substrate holder(s) 228, if any) located at another liquid dispensing station according to an implementation of the present disclosure. A liquid dispensing device 456 is located at the liquid dispensing station. In the present example, the liquid dispensing station is a flow cell station, and the liquid dispensing device 456 is a flow cell (module or assembly). The liquid dispensing device 456 as a flow cell module includes one or more flow cells 460 (depending on the number of substrates 104 being processed simultaneously, one or more liquid reservoirs (not shown) for supplying one or more bulk liquids, and one or more liquid flow devices (not shown) and associated liquid conduits needed for flowing one or more liquids from the liquid reservoirs to and through the flow cell(s) 460. Depending on the implementation, such liquid reservoirs and liquid flow device may be external or internal to the schematically illustrated liquid dispensing device 456.

In an implementation, at the flow cell station, the frame 220 (along with any components supported thereby), is located at a position at which the frame 220 (or at least the substrate(s) 104 supported thereby) is (substantially) parallel with the corresponding flow cell(s) 460, as shown in FIG. 4A. The frame 220 may have been moved to the position shown in FIG. 4A from another position such as the first position shown in FIG. 2A or the additional or intermediate position shown in FIG. 2C. At the position shown in FIG. 4A, the frame 220 is positioned at a distance from the flow cell(s) 460 along the Y-axis. This position may be referred to as an "open flow cell position" in that the flow cell(s) 460 are not closed or fluidly sealed, but instead are open to the surrounding environment (e.g., as open recesses or cavities).

Figure 4B:
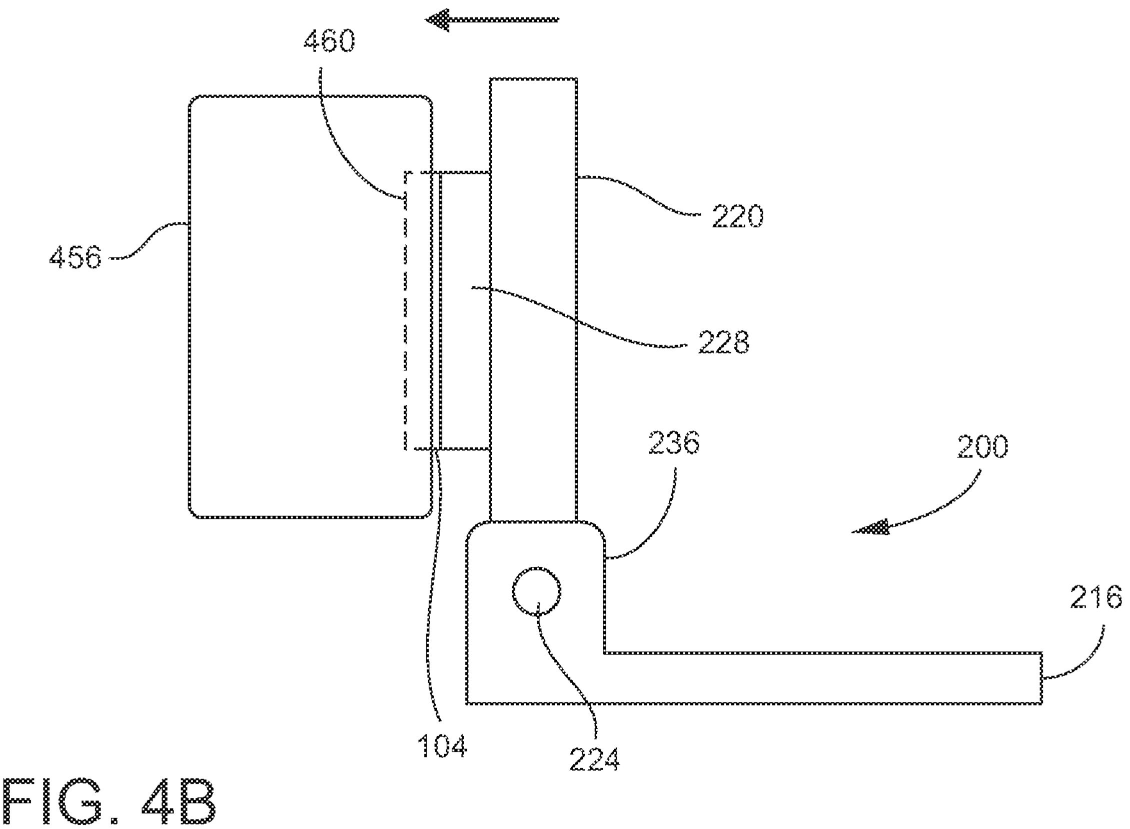
FIG. 4B is a side view of the substrate orientation device oriented at a closed flow cell position and located at the flow cell station, according to an implementation of the present disclosure.

By comparison, FIG. 4B is a side view of the substrate orientation device 200 located at the same liquid dispensing station shown in FIG. 4A, after the substrate orientation device 200 has been moved toward the flow cell(s) 460 (e.g., from the position shown in FIG. 4A) such that the substrate(s) 104 now at least partially close the flow cell(s) 460. This movement is depicted by an arrow in FIG. 4B. The substrate(s) 104 may "partially" close the flow cell(s) 460 in the sense that other components (e.g., structures of the frame 220, and/or the substrate holder(s) 228, and/or liquid dispensing device 456) may contribute to the full closure or fluidic sealing of the flow cell(s) 460 in a liquid-tight or leak-free manner. For example, gaskets or other appropriate scaling elements may be located at the perimeters of the flow cell(s) 460, as appreciated by persons skilled in the art. At the closed flow cell position, the liquid dispensing device may be operated to apply one or more types of bulk liquid to the substrate(s) 104, particularly the top surface(s) 112 of the substrate(s) 104 that face the interior(s) of the closed flow cell(s) 460.

More particularly, at the closed flow cell position, the top surface 112 of each substrate 104, and thus the array of spots 108 (FIG. 1), faces inwardly toward the interior of the corresponding flow cell 460. At the closed flow cell position, one or more bulk liquids may be flowed through the flow cell 460 and into contact with the spots 108. In one implementation, the flow cell 460 is filled from the bottom up to purge bubbles from the flow cell 460 and provide uniform coverage of the top surface 112 of the substrate 104. Generally, the type of liquids flowed through the flow cell 460 depends on the specific method being implemented and the stage of the method being performed at a given instance of time. Examples of liquids include, but are not limited to, solutions configured to finalize the linkage of a phosphoramidite or other deposited molecule, solutions to prepare the biomolecule to accept the next deposited molecule, solutions configured to remove non-specifically bound target molecules from the substrate 104, various reagents, solvents, linkers, catalysts, buffers, solutions for washing/rinsing, etc.

The substrate orientation device 200, and particularly the substrate(s) 104, should be accurately positioned relative to the flow cell(s) 460 to achieve successfully aligned and liquid-tight or leak-free closure of the flow cell(s) 460 by the substrate(s) 104. As noted elsewhere, a movable stage supporting the substrate orientation device 200 may be utilized for this purpose. The substrate orientation device 200, and/or an associated liquid dispensing system such as described below, may include positional sensors (e.g., encoders) as described below, to enhance positional accuracy and repeatability for operations at the liquid dispensing device 456.

Thus, in an implementation of the substrate orientation device 200, the frame 220 is configured to move to an open flow cell position (FIG. 4A) at which the frame 220, or at least the substrate(s) 104 while supported by the frame 220, is parallel with the flow cell(s) 460. Further, the frame 220 is configured to move from the open flow cell position (FIG.

4A) to a closed flow cell position (FIG. 4B) at which the substrate(s) 104 while supported by the frame 220 at least partially close the flow cell(s) 460.

Depending on the position of the substrate orientation device 200 relative to the liquid dispensing device 456 during a given operation, the above-described "second position" of the substrate orientation device 200 shown in FIG. 2B may, for example, correspond to the open flow cell position shown in FIG. 4A or the closed flow cell position shown in FIG. 4B.

Thus, in some implementations of the substrate orientation device 200, the frame 220 is configured to move to a mounting position at which the substrate(s) 104 are mountable to the frame 220. Further, the frame 220 is configured to move to an open flow cell position (FIG. 4A) at which the frame 220, or at least the substrate(s) 104 while mounted on the frame 220, is parallel with the flow cell(s) 460. Further, the frame 220 is configured to move from the open flow cell position (FIG. 4A) to a closed flow cell position (FIG. 4B) at which the substrate(s) 104 while supported by the frame 220 at least partially close the flow cell(s) 460.

The "mounting position" may correspond to the above-described "first position" shown in FIG. 2A or 3, or to an additional position oriented at an angle to the first position such as shown in FIG. 2C.

In an implementation, movements of the frame 220 such as to the mounting position, the open flow cell position, and the closed flow cell position, may be controlled by an appropriate controller. An example of a controller 600 is described below with reference to FIGS. 6 and 7.

For purposes of description of certain implementations, the liquid dispensing device 334 illustrated in FIG. 3 may be referred to as a "first" liquid dispensing device, and the liquid dispensing device 456 illustrated in FIGS. 4A and 4B may be referred to as a "second" liquid dispensing device.

Figure 5A:
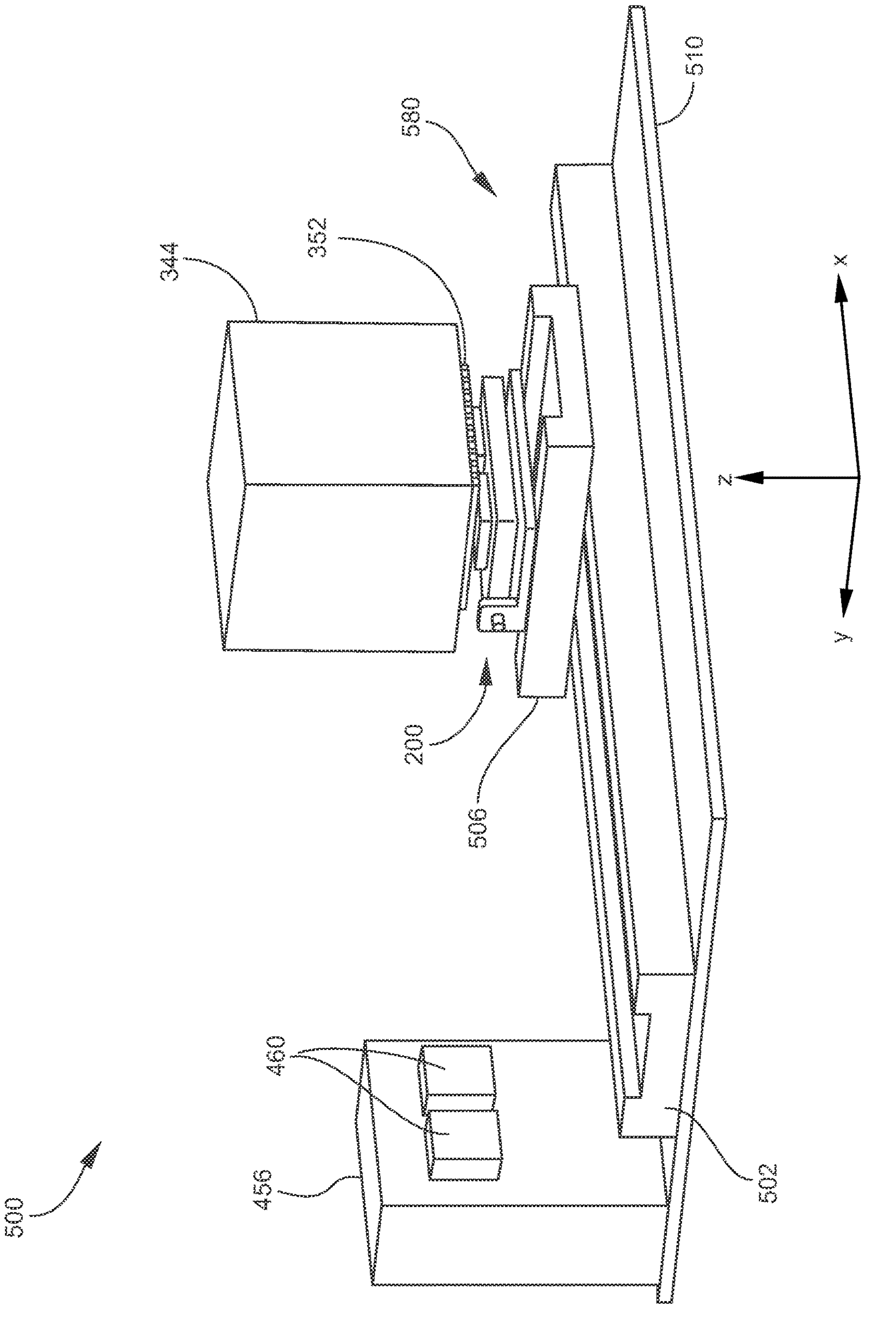
FIG. 5A is perspective view of an example of a liquid dispensing system, showing a substrate orientation device oriented at a first position and located at a printer, according to an implementation of the present disclosure.
Figure 5B:
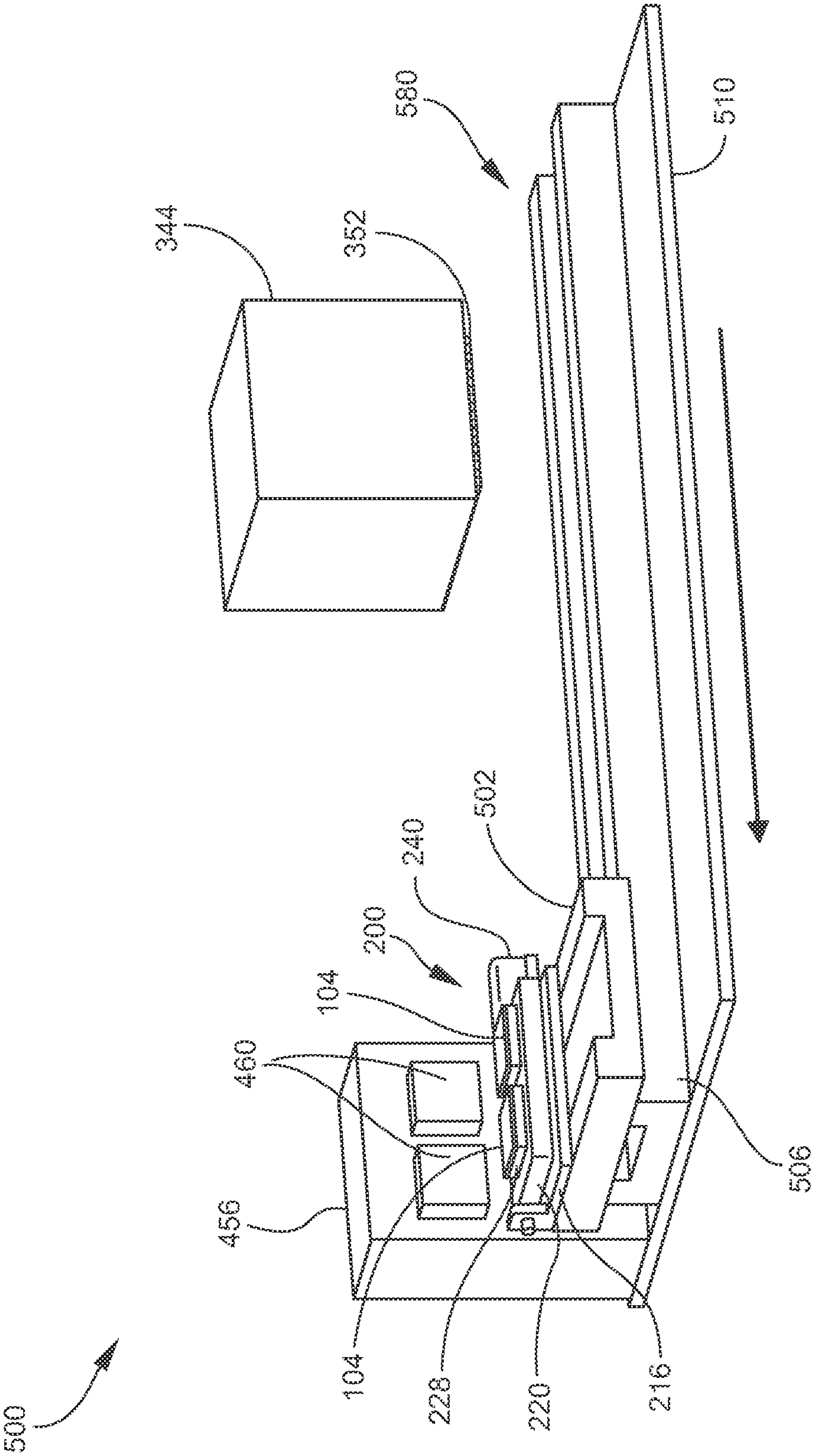
FIG. 5B is perspective view of the liquid dispensing system illustrated in FIG. 5A, showing the substrate orientation device oriented at the first position and located at a flow cell assembly, according to an implementation of the present disclosure.
Figure 5C:
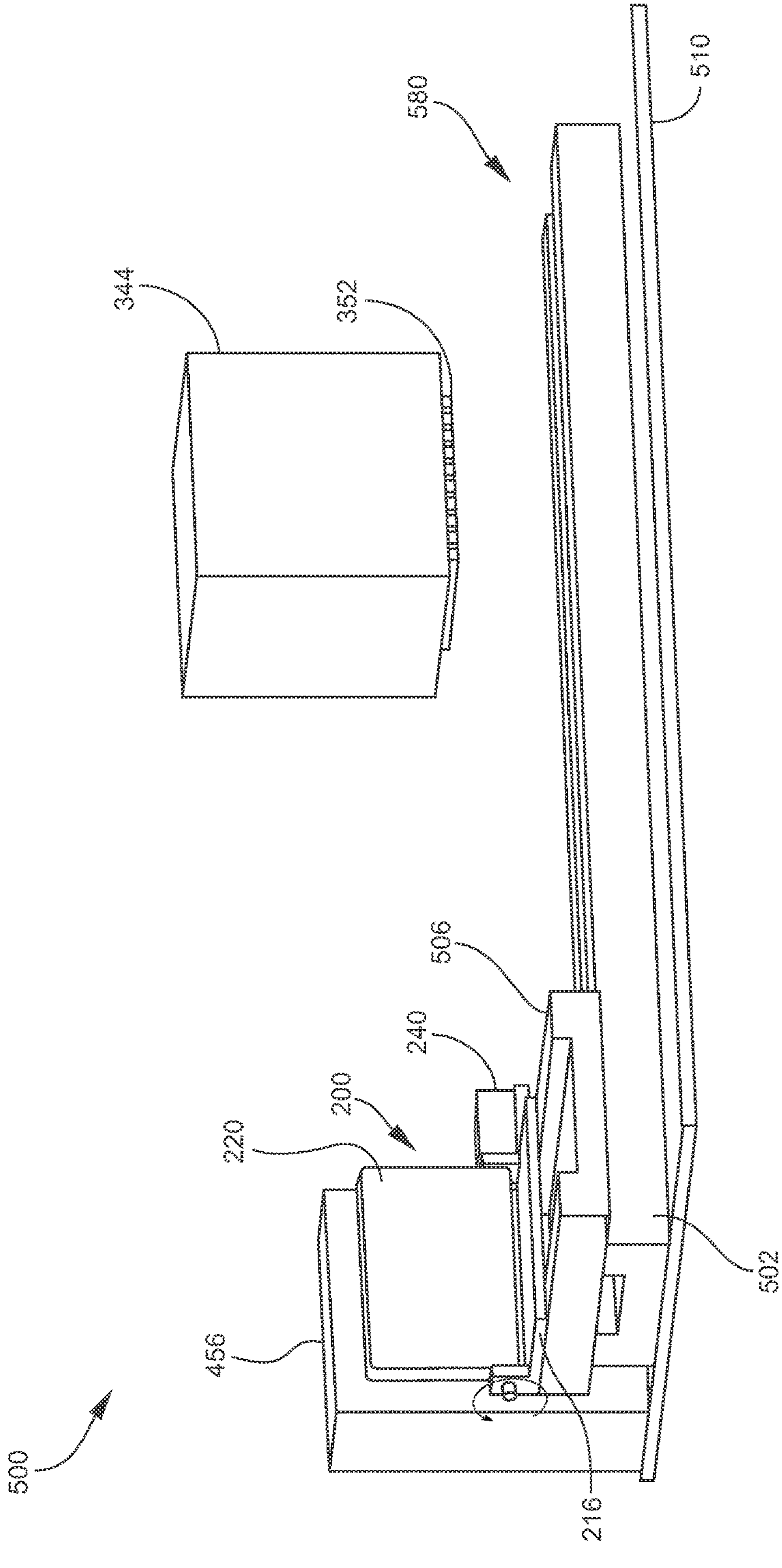
FIG. 5C is perspective view of the liquid dispensing system illustrated in FIG. 5A, showing the substrate orientation device oriented at a second position and located at the flow cell assembly, according to an implementation of the present disclosure.

FIGS. 5A-5C are perspective views of an example of a liquid dispensing system 500 according to an implementation of the present disclosure. The liquid dispensing system 500 includes a substrate orientation device (in this example, the substrate orientation device 200 illustrated in FIGS. 2A-4B), a first liquid dispensing device 344 located at a first liquid dispensing station, and a second liquid dispensing device 456 located at a second liquid dispensing station. In this example, the first liquid dispensing device 344 corresponds to the printer located at a printing station and shown in FIG. 3, and the second liquid dispensing device 456 corresponds to the located at a flow cell station and shown in FIGS. 4A and 4B.

FIG. 5A shows the substrate orientation device 200 (or more specifically the substrate(s) 104) oriented at the first position described above and illustrated in FIGS. 2A and 3, which may be referred to as a first liquid dispensing position. FIG. 5A also shows the substrate orientation device 200 located at the first liquid dispensing device 344. FIG. 5B shows the substrate orientation device 200 (or more specifically the substrate(s) 104) oriented at the first position but located at the second liquid dispensing device 456. For example, the liquid dispensing system 500 may have moved (or transported) the substrate orientation device 200 from the first liquid dispensing device 344 to the second liquid dispensing device 456, as indicated by an arrow in FIG. 5B. FIG. 5C shows the substrate orientation device 200 (or more specifically the substrate(s) 104, not visible) oriented at the second position while located at the second liquid dispensing device 456, as described above and illustrated in FIGS. 2B, 4A and 4B. For example, the substrate orientation device 200 may have moved the frame 220 and substrate(s) 104 from the first position shown in FIG. 5B to the second position shown in FIG. 5C. When the substrate(s) 104 are located at the second position specifically shown in FIGS. 4B and 5C, the second position may be referred to as a second liquid dispensing position, which in the present example also may be referred to as a closed flow cell position.

The liquid dispensing system 500 is configured to move (transport) the substrate orientation device 200 (and thus the substrate(s) 104 supported thereon) to at least the locations shown in FIGS. 5A-5C. For this purpose, in the illustrated example, the liquid dispensing system 500 includes a stage assembly 580 (or motion control system) configured to move (e.g., linearly translate) the substrate orientation device 200 along one or more axes. In the illustrated example, the stage assembly 580 includes an X-axis (or first axis) drive assembly 502 and a Y-axis (or second axis) drive assembly 506. The X-axis drive assembly 502 is configured to move the substrate orientation device 200 back and forth along the X-axis, in particular to and between the first liquid dispensing device 344 (FIG. 5A) and the second liquid dispensing device 456 (FIG. 5B). The Y-axis drive assembly 506 is configured to move the substrate orientation device 200 back and forth along the Y-axis, which may be useful for various functions. For example, the Y-axis drive assembly 506 along with X-axis drive assembly 502 may be utilized to accurately and repeatedly position the substrate orientation device 200 (and thus the substrate(s) 104) in the correct location in the X-Y plane relative to the first liquid dispensing device 344 and/or the second liquid dispensing device 456. As another example, the Y-axis drive assembly 506 may be utilized to move the frame 220 and the substrate(s) 104 supported thereon to and from the open flow cell position and the closed flow cell position respectively illustrated in FIGS. 4A and 4B. As another example, the Y-axis drive assembly 506 may be useful for facilitating the loading of the substrate(s) 104 onto the substrate orientation device 200, and/or the removal of the substrate(s) 104 from the substrate orientation device 200, by a user or a robot. Such Y-axis positioning may be done in addition to, or as an alternative to, moving the frame 220 to a dedicated mounting position such as in the example shown in FIG. 2C. The stage assembly 580 may also include a Z-axis (or third axis) drive assembly (not shown) if needed to allow vertical adjustment or positioning of the substrate(s) 104 relative to the first liquid dispensing device 344 and/or the second liquid dispensing device 456.

In the illustrated example, the substrate orientation device 200 is supported on the Y-axis drive assembly 506 by way of a movable component of the Y-axis drive assembly 506, such as a stage, plate, carriage or other structure that connects the substrate orientation device 200 to one or more other movable components of the Y-axis drive assembly 506, in such a way that the substrate orientation device 200 moves together with the movable component(s) of the Y-axis drive assembly 506. In turn, the Y-axis drive assembly 506 is supported on the X-axis drive assembly 502 by way of a movable component of the X-axis drive assembly 502, such as a stage, plate, carriage or other structure that connects the Y-axis drive assembly 506 to one or more other movable components of the X-axis drive assembly 502, in such a way that the Y-axis drive assembly 506 (and thus the substrate orientation device 200) moves together with the movable component(s) of the X-axis drive assembly 502. More generally, persons skilled in the art appreciate that various other alternative configurations for the stage assembly 580 as a motion control system may be implemented to realize controlled motion of the substrate orientation device 200 in the X-direction, or additionally the Y-direction, or additionally the Z-direction.

In the illustrated example, the liquid dispensing system 500 includes a deck (or table, bench, optical bench, platform, base, etc.) 510 on which various components of the liquid dispensing system 500 are supported. Such components may be fixed or attached to the deck 510 or may simply rest on the deck 510. The deck 510 may be configured to suppress vibrations generated by certain components of the liquid dispensing system 500. Depending on the implementation, the deck 510 may be considered to be part of or separate from the liquid dispensing system 500. In addition, all or part of the liquid dispensing system 500 may be enclosed by an appropriate enclosure (not shown).

The order or sequence of the movements of the substrate orientation device 200 performed by the liquid dispensing system 500 (in particular the stage assembly 580) and the number of times (iterations) that one or more of these movements are repeated or cycled during a given operational procedure, and the order or sequence of the movements of the frame 220 and substrate(s) 104 relative to the base 216 of the substrate orientation device 200 and the number of times (iterations) that one or more of these movements are repeated or cycled during a given operational procedure, depend on the particular application or method being implemented.

Figure 6:
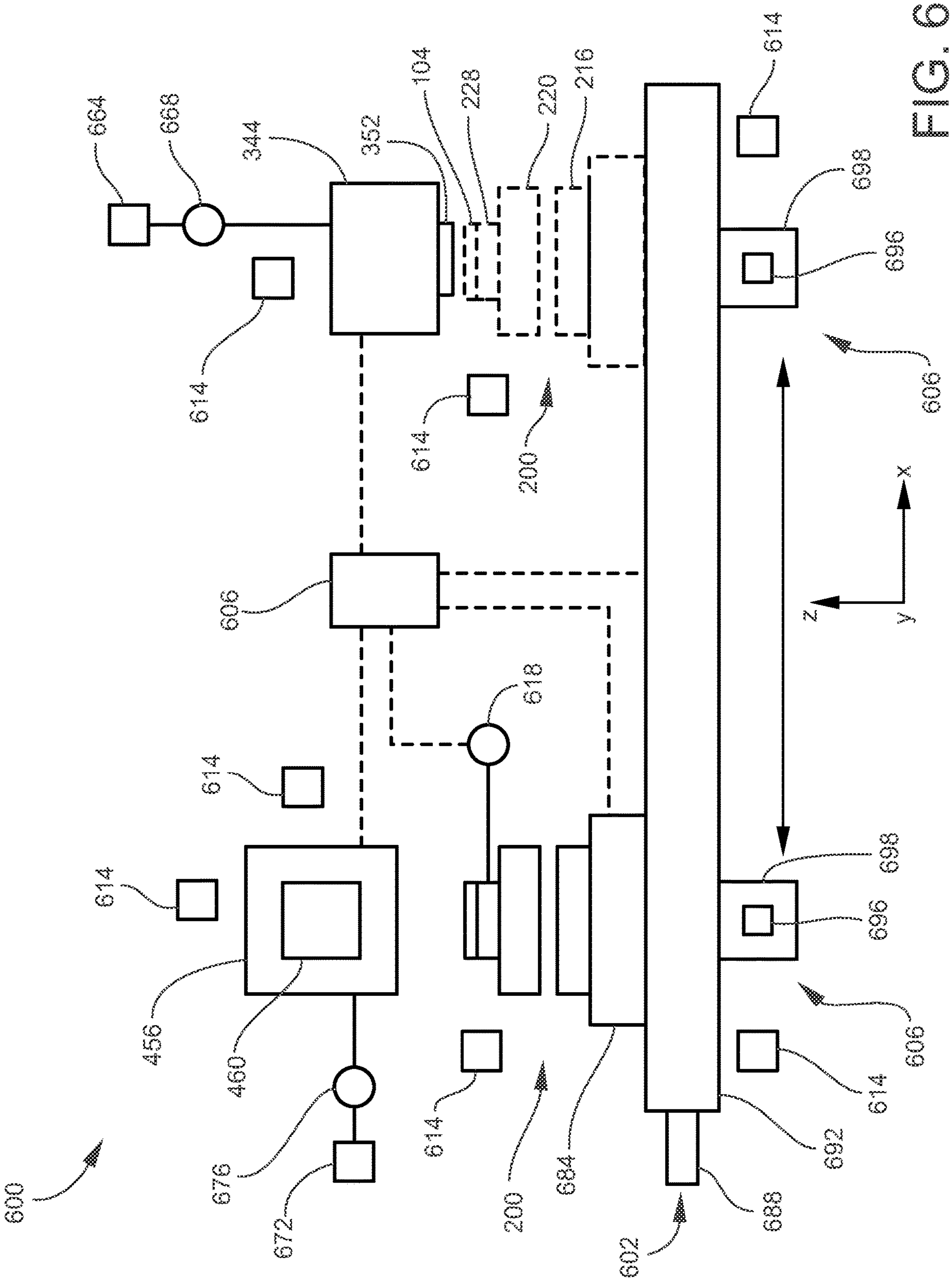
FIG. 6 is a front elevation view of another example of a liquid dispensing system according to an implementation of the present disclosure.

FIG. 6 is a front elevation view of an example of a liquid dispensing system 600 according to another implementation of the present disclosure. The liquid dispensing system 600 may be similar to the liquid dispensing system 500 just described and illustrated in FIGS. 5A-5C. Accordingly, in the example of FIG. 6, the liquid dispensing system 600 includes a substrate orientation device (such as the substrate orientation device 200 illustrated in FIGS. 2A-4B), a first liquid dispensing device located at a first liquid dispensing station (such as the liquid dispensing device 344 illustrated in FIG. 3), and a second liquid dispensing device located at a second liquid dispensing station (such as the liquid dispensing device 456 illustrated in FIGS. 4A and 4B). As described above, the first liquid dispensing device 344 may be or include a printer, and the second liquid dispensing device 456 may be or include a flow cell assembly.

Depending on the type of device, the first liquid dispensing device 344 may include one or more liquid reservoirs 664 and liquid flow devices 668, which may or may not be integrated with the main structure of the first liquid dispensing device 344. Depending on the type of device, the second liquid dispensing device 456 may include one or more liquid reservoirs 672 and liquid flow devices 676, which may or may not be integrated with the main structure of the flow cell assembly 456.

The liquid dispensing system 600 also includes a stage assembly 680 configured to move (e.g., linearly translate) the substrate orientation device 200 along one or more axes. The stage assembly 680 may be similar to the stage assembly 580 described above and illustrated in FIGS. 5A-5C, and accordingly may include an X-axis (or first axis) drive assembly 602 and a Y-axis (or second axis) drive assembly 606. In the present example, the stage assembly 680 includes a movable stage 684 on which the substrate orientation device 200 is mounted, which generally has the form of a plate. Alternatively, the movable stage 684 may be embodied as a component connected to the base 216 of the substrate orientation device 200 that is not plate-shaped. Alternatively, the base 216 itself may function as, or be considered as being, the movable stage 684, in which case a separate movable stage may not be provided. Persons skilled in the art appreciate that various other alternative configurations for the stage assembly 680 as a motion control system may be implemented to realize controlled motion of the substrate orientation device 200 along the desired axis or axes.

In the present example, the X-axis drive assembly 602 includes an X-axis driver 688 (including, for example, a bidirectional stepper or servo motor) through a linear guide and transmission linkage 692 (e.g., belt and pulley, chain and cog, screw and worm gear, etc.). In this example, the movable stage 684 is coupled to the X-axis driver 688. Accordingly, the movable stage 684 is configured to move (transport) the substrate orientation device 200 (and thus the substrate(s) 104) to and between the first liquid dispensing device 344 and the second liquid dispensing device 456 (e.g., to and between a first liquid dispensing station and a second liquid dispensing station), as indicated by a double-headed arrow in FIG. 6. The movable stage 684 also may be configured to move the substrate orientation device 200 along the Y-axis at either or both of the first and second liquid dispensing stations through operation of the Y-axis drive assembly 606, for purposes such as described above in relation to the liquid dispensing system 500 illustrated in FIGS. 5A-5C. In the present example, the Y-axis drive assembly 606 includes one or more Y-axis drivers 696 (including, for example, one or more bidirectional stepper or servo motors) and associated linear guides and transmission linkages 698. As noted previously, to allow vertical adjustment of the substrate(s) 104 relative to the first liquid dispensing device 344 and/or the second liquid dispensing device 456, the stage assembly 680 may additionally include hardware for enabling Z-axis movement (not shown).

To enhance positional accuracy and repeatability, the substrate orientation device 200, the first liquid dispensing device 344, the second liquid dispensing device 456, and/or the associated liquid dispensing system 500 or 600, may also include positional sensors (e.g., encoders) 614 configured to detect, measure, and/or track the position of the substrate(s) 104, the substrate orientation device 200, the stage 684, and/or other movable or repositionable devices or instruments. As examples, one or more positional sensors 614 may be configured to assist in properly aligning the substrate(s) 104 with the first liquid dispensing device 344 and/or the second liquid dispensing device 456. A few examples of possible locations of positional sensors 614 are schematically illustrated in FIG. 6. The use of positional sensors 614 in cooperation with movable/repositionable components of a system or assembly are generally understood by persons skilled in the art. Positional sensors 614 may be utilized, for example, to measure the position of the substrate(s) 104 with reference to a coordinate system (e.g., considering one or more X-, Y-, Z-, θ-axes), determine whether the substrate position has changed (deviated) in comparison to the previous iteration of the same operational step, calibrate a component responsible for moving or adjusting the substrate position, etc. Generally, the positional sensors 614 may be of any appropriate type, and often are optics-based devices. For example, a positional sensor may include a light source (e.g., a laser, laser diode (LD), light-emitting diode (LED), broadband lamp, etc.) and a light detector (e.g., a photodiode (PD), photomultiplier tube (PMT), camera, etc.), or additionally other optical components (e.g., a lens, mirror, etc.). Optionally, one or more positional sensors 614 may detect features on the substrate(s) 104 such as fiducials, features on the substrate holder 228, or encoder positions. In addition, one or more positional sensors 614 may be positioned to direct a light beam into intersection with the paths of liquid droplets dispensed by the printing elements 352 of the first liquid dispensing device 344, thereby enabling the detection of misfiring by one or more of the printing elements 352 (e.g., due to clogging or malfunction).

As described above, the substrate holder(s) 228 may be vacuum-based devices (e.g., vacuum chucks). In this case, the liquid dispensing system 600 includes one or more vacuum sources 618 appropriately fitted in fluid communication with the substrate holder(s) 228.

The liquid dispensing system 600 (or 500) also may include a system controller (or controller, or computing device) 700. The system controller 700 may schematically represent one or more modules (or units, or components) configured for controlling, monitoring and/or timing various functional aspects of the liquid dispensing system 600 (or 500) including, for example, the operations of the substrate orientation device 200, the first liquid dispensing device 344, the second liquid dispensing device 456, and the stage assembly 680. For all such purposes, the system controller 700 may be in wired or wireless communication with one or more of the components of the liquid dispensing system 600 (or 500), as depicted by dashed lines in FIG. 6, and may include any suitable combination of hardware, firmware, software, etc., including one or more electronics-based processors and memories, as appreciated by persons skilled in the art. For example, the system controller 700 may include a non-transitory (or tangible) computer-readable medium that includes non-transitory instructions for performing any of the methods disclosed herein. A further example of the system controller 700 is described below in conjunction with FIG. 7.

Additional examples of liquid dispensing systems (e.g., 500 or 600, see FIGS. 5A-6) according to the present disclosure will now be described.

In an implementation, a liquid dispensing system includes a substrate orientation device such as the substrate orientation device 200 described above in conjunction with FIGS. 2A-4B. The liquid dispensing system may further include one or more liquid dispensing devices (e.g., 344 and/or 456, see FIGS. 3-6) configured to dispense a liquid on the substrate(s) 104 while the substrate(s) 104 are supported by the substrate orientation device (e.g., by the frame 220 of the substrate orientation device 200).

In an implementation, the frame (and thus any substrates supported thereby) is movable to a mounting position (e.g., the first position shown in FIG. 2A, the additional position shown in FIG. 2C, etc.) at which the substrate is mountable to the frame.

In an implementation, the liquid dispensing device may be configured to apply a bulk liquid to the substrate while the substrate is supported by the frame. For example, the liquid dispensing device may be or include a flow cell configured to receive the substrate while the substrate is supported by the frame, as described above. The frame may be movable to an open flow cell position at which the frame, or at least the substrate while supported by the frame, is adjacent to (or additionally parallel to) the flow cell. The frame also may be movable to a closed flow cell position at which the substrate while supported by the frame at least partially closes the flow cell.

In another implementation, the liquid dispensing device may be configured to deposit droplets on the substrate while the substrate is supported by the frame. For example, the liquid dispensing device may be or include a printer as described above.

In an implementation, the liquid dispensing system may include at least a first liquid dispensing device (e.g., 344, see FIGS. 5A-6) configured to dispense a first liquid on the substrate while the substrate is supported by the frame, and a second liquid dispensing device (e.g., 456, see FIGS. 5A-6) configured to dispense a second liquid on the substrate while the substrate is supported by the frame. The first liquid dispensing device may be configured to deposit a plurality of droplets on the substrate as the first liquid (such as in the case of a printer), and the second liquid dispensing device may be configured to apply a bulk liquid to the substrate as the second liquid (such as in the case of a flow cell), as described above.

In an implementation, the liquid dispensing system may include a stage (e.g., see FIGS. 5A-6) configured to move the substrate orientation device to and between the first liquid dispensing device and the second liquid dispensing device. The stage may be configured to move along one or more axes (e.g., the X-axis, the X- and Y-axes, or additionally the Z-axis). In such implementation, the substrate orientation device may be mountable or coupled to the stage in an appropriate manner and movable therewith. One or more substrates may be mounted to the substrate orientation device (e.g., the frame thereof) before or after mounting the substrate orientation device to the stage.

In an implementation, the liquid dispensing system may include a controller configured to control an operation that includes moving the frame relative to the base and/or moving the substrate orientation device to and from the liquid dispensing device. In an implementation, the substrate remains supported by the frame during and between the moving of the frame and the moving of the substrate orientation device. In other words, the substrate does not need to be removed from the substrate orientation device at any time during the entire performance of these movement tasks.

In an implementation, the liquid dispensing system may include a controller configured to control an operation that includes depositing droplets on the substrate while supported by the frame and/or applying a bulk liquid to the substrate while supported by the frame. The droplets may be deposited as an array of droplets on an array of corresponding sites (or addressable locations) on the substrate, as described above. In an implementation, the substrate remains supported by the frame during and between the depositing of the droplets and the applying of the bulk liquid. In other words, when performing these two types of liquid dispensing tasks in sequence, the substrate does not need to be removed from the substrate orientation device at any time during the sequence.

In an implementation, the liquid dispensing system may include a controller configured to control an operation that includes at least one of the following steps of movement: moving the frame to a mounting position at which the substrate is mountable to the frame; moving the frame to an open flow cell position at which the frame, or at least the substrate while supported by the frame, is parallel with a flow cell; and/or moving the frame to a closed flow cell position at which the substrate while supported by the frame at least partially closes a flow cell.

In an implementation, the liquid dispensing system may include a controller configured to control an operation that includes: (a) operating the substrate orientation device to move the substrate, while the substrate is supported by the substrate orientation device, to a first liquid dispensing position; (b) moving the substrate orientation device to a first liquid dispensing device; (c) at the first liquid dispensing device, dispensing a first liquid on the substrate while the substrate is at the first liquid dispensing position; (d) moving the substrate orientation device from the first liquid dispensing device to a second liquid dispensing device; (c) operating the substrate orientation device to move the substrate to a second liquid dispensing position oriented at an angle to first liquid dispensing position; and (f) at the second liquid dispensing device, dispensing a second liquid on the substrate while the substrate is at the second liquid dispensing position. The order or sequence of the steps (a)-(f) may vary depending on the implementation. For example, the substrate may be moved from one position to another position (e.g., relative to the base of the substrate orientation device) either before or after moving the substrate (with the substrate orientation device) to a particular liquid dispensing device.

In an implementation, between any two of the steps (a)-(f), the operation is performed without removing the substrate from the substrate orientation device. That is, the operation, or at least the steps (a)-(f) thereof, may be fully performed without ever removing (or needing to remove), the substrate from the frame.

Figure 7:
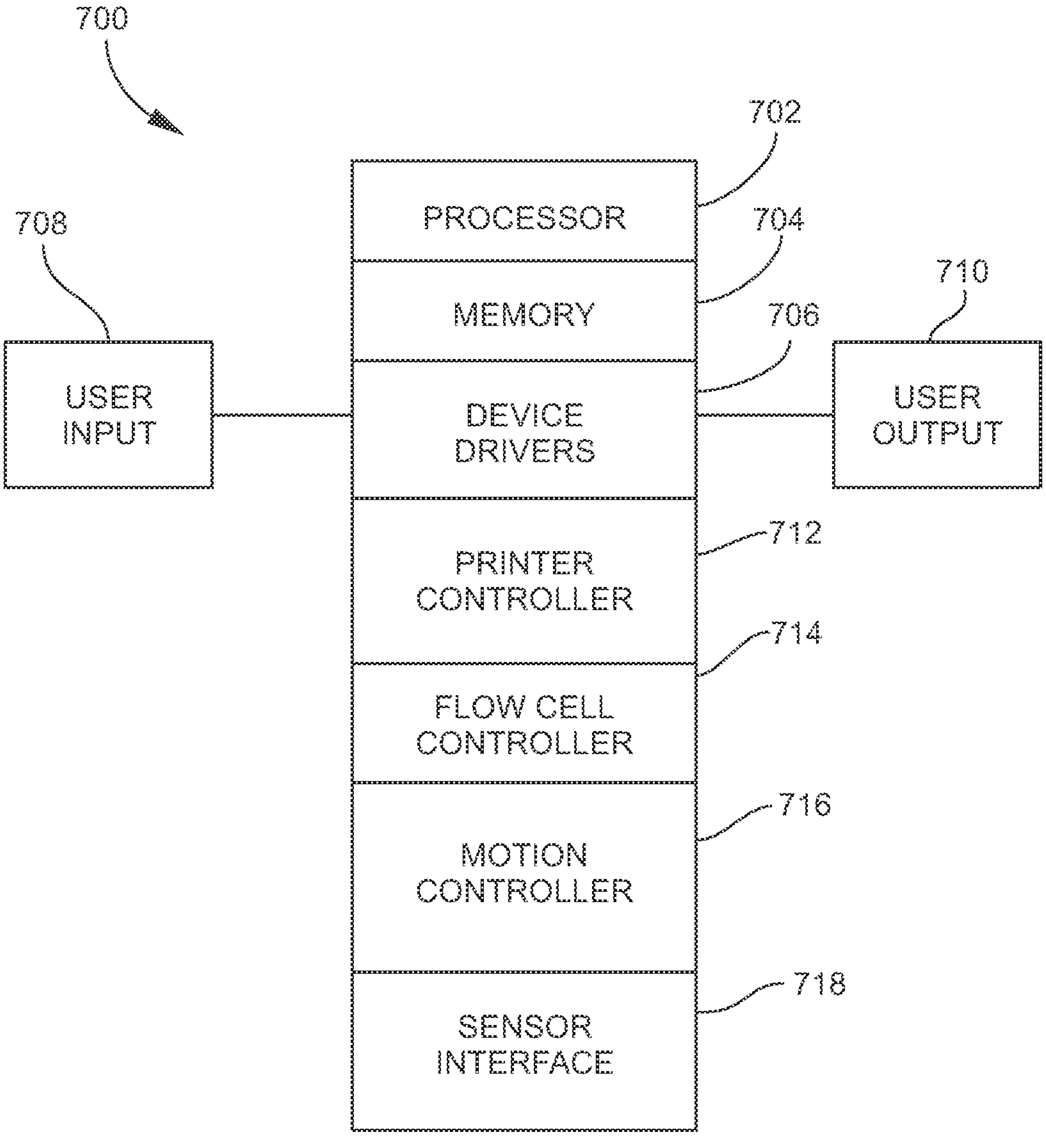
FIG. 7 is a schematic view of a system controller for a liquid dispensing system according to an implementation of the present disclosure.

FIG. 7 is a schematic view of a system controller 700 for a liquid dispensing system (e.g., 500 or 600) according to an implementation of the present disclosure. All or part of the controller 700 may correspond to the controller 700 described above in conjunction with FIG. 6. The controller 700 may schematically represent one or more modules, control units, components, or the like configured for controlling, monitoring, analyzing and/or timing the operations of various devices or components of the liquid dispensing system 500 or 600, as well as controlling or executing one or more steps of any of the methods disclosed herein. In addition to the various controllable devices or components described above in conjunction with FIGS. 2A-6, other devices may include, but are not limited to, electrical power (voltage) sources, timing controllers, clocks, frequency/waveform generators, processors, logic circuits, memories, databases, etc. One or more modules of the controller 700 may be, or be embodied in, one or more devices located outside or separate from the liquid dispensing system (e.g., 500 or 600), for example, a computer workstation, desktop computer, laptop computer, portable computer, tablet computer, handheld computer, mobile computing device, personal digital assistant (PDA), smartphone, etc. One or more modules of the controller 700 may communicate with one or more other modules via one or more busses or other types of communication lines or wireless links, as appreciated by persons skilled in the art.

In the illustrated implementation, the controller 700 includes one or more electronics-based processors 702, which may be representative of a main electronic processor providing overall control, and one or more electronic processors configured for dedicated control operations or specific signal processing tasks (e.g., a graphics processing unit or GPU, a digital signal processor or DSP, an application-specific integrated circuit or ASIC, a field-programmable gate array or FPGA, etc.). The controller 700 also includes one or more memories 704 (volatile and/or non-volatile types, e.g., RAM and/or ROM) for storing data and/or software. Stored data may be organized, for example, in one or more databases or look-up tables. The controller 700 may also include one or more device drivers 706 for controlling one or more types of user interface devices and providing an interface between the user interface devices and components of the controller 700 communicating with the user interface devices. Such user interface devices may include user input devices 708 (e.g., keyboard, keypad, touch screen, mouse, joystick, trackball, and the like) and user output devices 710 (e.g., display screen, printer, visual indicators or alerts, audible indicators or alerts, and the like). In various implementations, the controller 700 may be considered as including one or more of the user input devices 708 and/or user output devices 710, or at least as communicating with them.

In some implementations, the controller 700 may also include one or more types of computer programs or software contained in memory and/or on one or more types of non-transitory (or tangible) computer-readable media. One or more devices of the controller 700 may be configured to receive and read (and optionally write to) the computer-readable media. The computer programs or software may contain non-transitory instructions (e.g., logic instructions) for controlling or performing various operations of the liquid dispensing system 500 or 600, such as the operations of the various devices described herein. The computer programs or software may include system software and application software. System software may include an operating system (e.g., a Microsoft Windows® operating system) for controlling and managing various functions of the controller 600, including interaction between hardware and application software. In particular, the operating system may provide a graphical user interface (GUI) displayable via a user output device 710, and with which a user may interact with the use of a user input device 708. Application software may include software configured to control or execute various operations of the liquid dispensing system 500 or 600, and/or some or all of the steps of any of the methods disclosed herein.

The controller 700 may also include a first liquid dispensing device (e.g., printer) controller (or control module) 712 configured to control the operation of the first liquid dispensing device 344, a second liquid dispensing device (e.g., flow cell) controller (or control module) 714 configured to control the operation of the first liquid dispensing device 456, and a motion or stage controller (or control module) 716 configured to control the operation of the stage assembly 580 or 680 (see FIGS. 5A-5C and 6). The controller 700 may also include one or more sensor interfaces 718 configured to receive and process feedback (e.g., measurement) signals received from one or more sensors provided with the liquid dispensing system 500 or 600, such as the positional sensors 614 described above (FIG. 6). For example, the sensor interfaces 718 may be embodied in different pieces of firmware or other electronic circuitry that are part of a microcontroller of the controller 700. The sensor interfaces 718 may communicate with the first liquid dispensing device controller 712, the second liquid dispensing device controller 714, and the motion controller 716 as needed to provide effective control of various operations of the liquid dispensing system 500 or 600 described herein. The firmware or other electronic circuitry embodying the first liquid dispensing device controller 712, the second liquid dispensing device controller 714, and the motion controller 716 also may be provided with the same microcontroller that includes the sensor interfaces 718, or may be provided with separate hardware of the controller 700.

Additional examples of methods for dispensing liquid on a substrate according to the present disclosure will now be described. One or more of the methods may utilize a substrate orientation device (e.g., 200, see FIGS. 2A-4B) and/or a liquid dispensing system e.g., 500 or 600, see FIGS. 5A-6), which may include one or more liquid dispensing devices (e.g., 344 and/or 456, see FIGS. 3-6), according to any of the implementations described herein.

Figure 8:
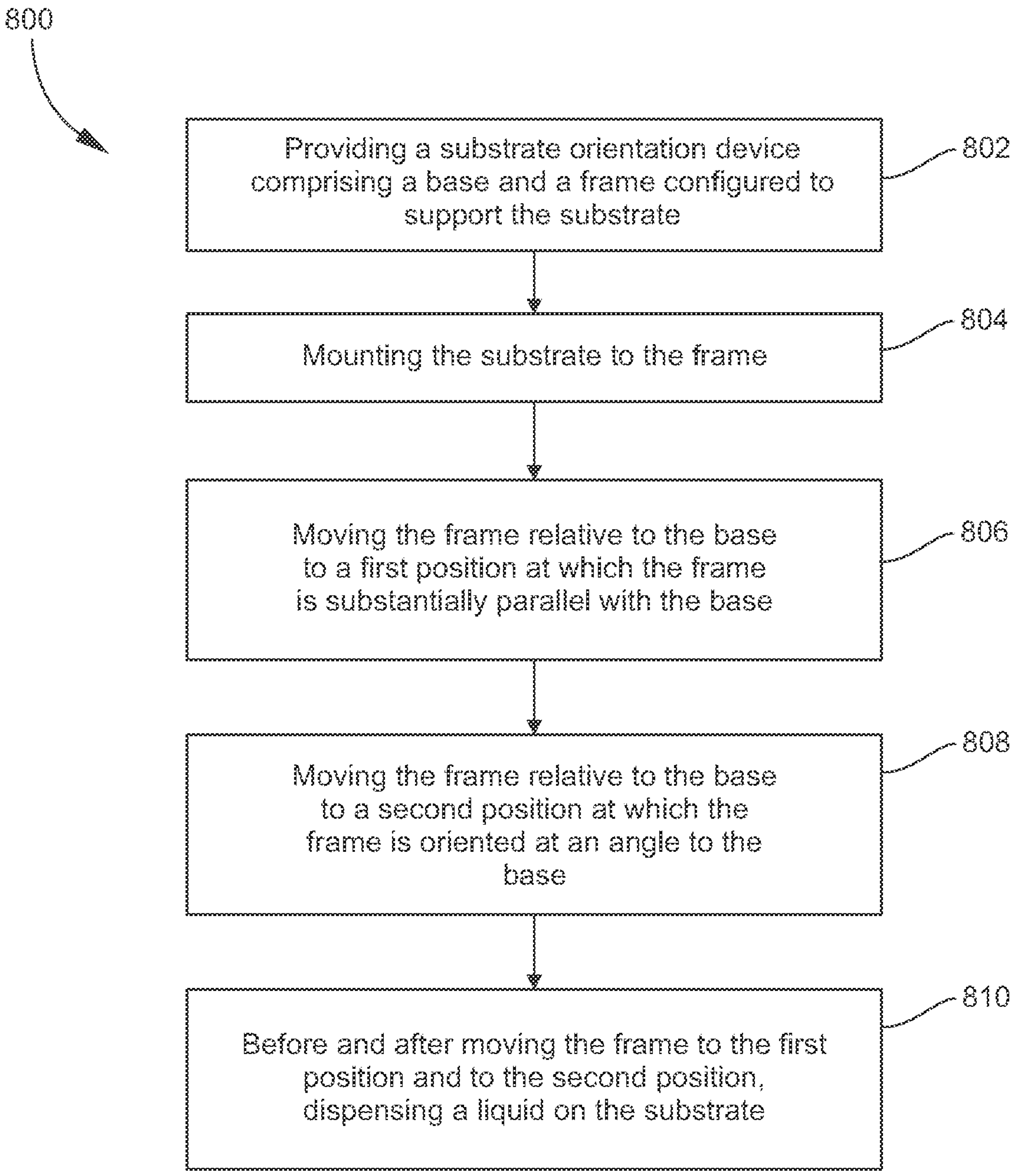
FIG. 8 is a flow diagram illustrating an example of a method for dispensing liquid according to an implementation of the present disclosure.

FIG. 8 is a flow diagram 800 illustrating an example of a method for dispensing liquid on a substrate according to an implementation of the present disclosure. In the method, a substrate orientation device is provided (step 802). The substrate orientation device includes a base and a frame configured to support the substrate, as described above. The substrate is mounted to the frame (step 804). Two more substrates may be mounted, and thereafter processed, simultaneously as described above. Before mounting the substrate, the substrate may be prepared for liquid dispensing operations as needed for the specific method being implemented. For example, the substrate may be prepared as needed for fabricating a specific (bio)chemical microarray. The frame (with the substrate mounted thereon) is then moved to a first position at which the frame is substantially parallel with the base (step 806). The frame is then moved to a second position at which the frame is oriented at an angle to the base (step 808). Before or after moving the frame to the first position and to the second position, a liquid is dispensed on the substrate (step 810). For example, a liquid may be dispensed on the substrate while the substrate is oriented at the first position and/or at the second position, depending on the particular method being implemented.

In an implementation, the method may include dispensing a first liquid on the substrate and dispensing a second liquid on the substrate. The dispensing of the first liquid may involve depositing a plurality of droplets on the substrate. The dispensing of the second liquid may involve applying a bulk liquid to the substrate. The dispensing of the first liquid may be done by a first liquid dispensing device, and the dispensing of the second liquid may be done by a second liquid dispensing device (e.g., a device that is different or separated from the first liquid dispensing device).

In an implementation, the dispensing of the first liquid is done while the substrate is oriented at a first liquid dispensing position and the substrate orientation device is at the first liquid dispensing device. The substrate orientation device may then be moved from the first liquid dispensing device to the second liquid dispensing device. The substrate may then be moved to a second liquid dispensing position (e.g., from the first liquid dispensing position to the second liquid dispensing position) by moving the frame. The dispensing of the second liquid is done while the substrate is oriented at the second liquid dispensing position and the substrate orientation device is at the second liquid dispensing device.

In an implementation, the moving of the substrate orientation device is done between the dispensing of the first liquid and the dispensing of the second liquid, and is done without removing the substrate from the frame.

Figure 9:
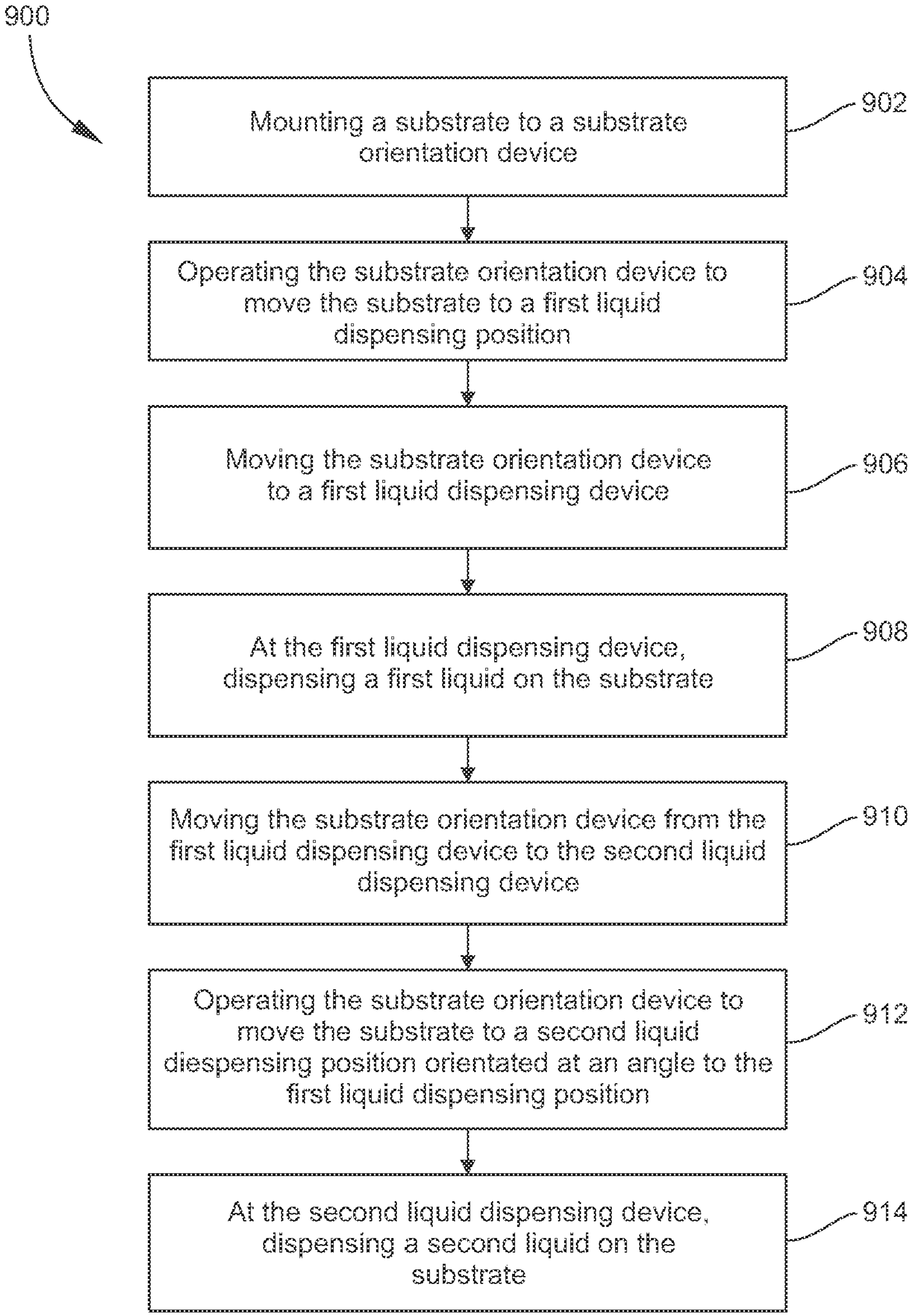
FIG. 9 is a flow diagram illustrating another example of a method for dispensing liquid according to another implementation of the present disclosure.

FIG. 9 is a flow diagram 900 illustrating another example of a method for dispensing liquid on a substrate according to an implementation of the present disclosure. In the method, a substrate is mounted to a substrate orientation device (step 902). The substrate orientation device may include a base and a frame configured to support the substrate, as described above. Two more substrates may be mounted, and thereafter processed, simultaneously as described above. Before mounting the substrate, the substrate may be prepared for application-dependent liquid dispensing operations as noted above. The substrate orientation device is then operated to move the substrate to a first liquid dispensing position (step 904). The substrate orientation device is then moved to a first liquid dispensing device (step 906). At the first liquid dispensing device, a first liquid is dispensed on the substrate (step 908). The substrate orientation device is then moved from the first liquid dispensing device to a second liquid dispensing device (step 910). The substrate orientation device is then operated to move the substrate to a second liquid dispensing position that is oriented at an angle to the first liquid dispensing position (step 912). At the second liquid dispensing device, a second liquid is dispensed on the substrate (step 914).

In an implementation, between any two of the steps 902-914, the method is performed without removing the substrate from the substrate orientation device. After mounting the substrate, all of the steps 904-914 may be performed while the substrate remains on the same frame (or same substrate holder). In other words, in an implementation, the substrate does not need to be removed from the frame or substrate holder until the liquid dispensing (e.g., microarray fabrication) process has been completed (at least, to the extent that the steps 902-914 have been completed). Moreover, during the liquid dispensing process, the substrate does not need to be removed and later remounted, either to the same frame or substrate holder or to a different frame or substrate holder.

As described elsewhere in this disclosure, in any of the methods, multiple steps (iterations) of liquid dispensing operations (e.g., droplet deposition and bulk liquid flow) may be performed as needed for the specific method being implemented. For this purpose, the substrate orientation device may be moved back and forth between two or more liquid dispensing devices (e.g., between a printer and a flow cell assembly) as many times as needed.

In an implementation, one or more steps of the methods just described and illustrated in FIGS. 8 and 9 may be controlled or performed by a controller including a processor, memory, and other components as appreciated by persons skilled in the art, such as the controller 700 described above in conjunction with FIG. 6 or 7.

In an implementation, the flow diagram 800 and/or 900 may represent a substrate orientation device, or additionally a liquid dispensing system, configured to carry out the steps shown in the flow diagram 800 and/or 900. For this purpose, various components of the substrate orientation device and/or liquid dispensing system described herein may be utilized.

The implementations of the subject matter disclosed herein (i.e., the substrate orientation device 200, or the substrate orientation device 200 in association with the liquid dispensing system 500 or 600, and the methods for dispensing liquid on a substrate, such as for fabricating a microarray), may provide one or more advantages. One advantage is eliminating the need to remove/transfer/remount the substrate(s) 104 from one frame or substrate holder to another (different) substrate holder. This in turn eliminates the need for a robot arm to perform swapping operations, as well as the need for a theta alignment axis (i.e., rotation about one or more of the X-, Y-, and Z-axes) and constant reliance on machine vision for realignment of the substrate(s). With implementations described herein, a single frame or substrate holder now can handle operations while the corresponding substrate is at any position or orientation, including the horizontal orientation that is optimal for droplet deposition and the vertical orientation that is optimal for flow cell processing.

EXEMPLARY IMPLEMENTATIONS

Exemplary implementations provided in accordance with the presently disclosed subject matter include, but are not limited to, the following:

1. A substrate orientation device for orienting a substrate configured as a solid support for liquid dispensing, the substrate orientation device comprising: a base; and a frame configured to support the substrate and to move relative to the base to a first position and to a second position, wherein: at the first position, the substrate while supported by the frame is substantially parallel with the base; and at the second position, the substrate while supported by the frame is oriented at an angle to the base.

2. The substrate orientation device of implementation 1, comprising a configuration according to at least one of: wherein at the second position, the substrate while supported by the frame is substantially perpendicular to the base; wherein the frame is movable to an additional position different from the first position and the second position; wherein the frame is movable to an additional position at which the substrate while supported by the frame is substantially perpendicular to the base; wherein the frame is movable to an additional position oriented at an angle between the first position and the second position; wherein the frame is rotatable to at least one of: the first position; the second position; an additional position different from the first position and the second position; wherein at least one of the base or the frame is linearly translatable to at least one of: the first position; the second position; an additional position different from the first position and the second position.

3. The substrate orientation device of implementation 1 or 2, comprising at least one of: the frame is movable to a mounting position at which the substrate is mountable to the frame; the frame is movable to an open flow cell position at which the frame, or at least the substrate while supported by the frame, is adjacent to a flow cell; the frame is movable to a closed flow cell position at which the substrate while supported by the frame at least partially closes a flow cell; the frame is movable from an open flow cell position to a closed flow cell position, wherein: at the open flow cell position, the frame, or at least the substrate while supported by the frame, is adjacent to a flow cell; and at the closed flow cell position, the substrate while supported by the frame at least partially closes the flow cell.

4. The substrate orientation device of any of the preceding implementations, comprising an actuator configured to drive movement of the frame relative to the base.

5. The substrate orientation device of implementation 4, comprising a coupling device coupling the actuator and at least one of the base and the frame, wherein the actuator is configured to drive the movement of the frame via the coupling device.

6. The substrate orientation device of implementation 5, wherein the coupling device comprises a configuration according to one of: the coupling device comprises an axle; the coupling device comprises an axle support; the coupling device comprises a rotatable axle, and the frame is configured to rotate with the axle; the coupling device comprises a rotatable axle and an axle support, and the frame is configured to rotate with the axle; the coupling device comprises an axle and a rotatable axle support, and the frame is configured to rotate with the axle support; the coupling device comprises an axle and an axle support, and the axle support is attached to or integral with at least one of the base or the frame.

7. The substrate orientation device of any of the preceding implementations, comprising a substrate holder mounted to or integral with the frame, and configured to support the substrate.

8. A liquid dispensing system, comprising: the substrate orientation device of any of the preceding implementations; and a liquid dispensing device configured to dispense a liquid on the substrate while the substrate is supported by the frame.

9. The liquid dispensing system of implementation 8, wherein the liquid dispensing device comprises a flow cell configured to receive the substrate while the substrate is supported by the frame.

10. The liquid dispensing system of implementation 9, comprising at least one of: the frame is movable to a mounting position at which the substrate is mountable to the frame; the frame is movable to an open flow cell position at which the frame, or at least the substrate while supported by the frame, is adjacent to the flow cell; the frame is movable to a closed flow cell position at which the substrate while supported by the frame at least partially closes the flow cell; the frame is movable from an open flow cell position to a closed flow cell position, wherein: at the open flow cell position, the frame, or at least the substrate while supported by the frame, is adjacent to the flow cell; and at the closed flow cell position, the substrate while supported by the frame at least partially closes the flow cell.

11. The liquid dispensing system of implementation 8, wherein the liquid dispensing device is configured to deposit droplets on the substrate while the substrate is supported by the frame.

12. The liquid dispensing system of implementation 11, wherein the liquid dispensing device comprises a printer.

13. The liquid dispensing system of implementation 8, wherein the liquid dispensing device is configured to apply a bulk liquid to the substrate while the substrate is supported by the frame.

14. The liquid dispensing system of implementation 13, wherein the liquid dispensing device comprises a flow cell.

15. The liquid dispensing system of implementation 8, wherein the liquid dispensing device is a first liquid dispensing device configured to dispense a first liquid on the substrate while the substrate is supported by the frame, and further comprising a second liquid dispensing device configured to dispense a second liquid on the substrate while the substrate is supported by the frame.

16. The liquid dispensing system of implementation 15, wherein the first liquid dispensing device is configured to deposit a plurality of droplets on the substrate as the first liquid, and the second liquid dispensing device is configured to apply a bulk liquid to the substrate as the second liquid.

17. The liquid dispensing system of implementation 15 or 16, comprising a stage configured to move the substrate orientation device between the first liquid dispensing device and the second liquid dispensing device.

18. The liquid dispensing system of any of implementations 15-17, comprising a controller configured to control an operation comprising: (a) operating the substrate orientation device to move the substrate, while the substrate is supported by the substrate orientation device, to a first liquid dispensing position; (b) moving the substrate orientation device to the first liquid dispensing device; (c) at the first liquid dispensing device, dispensing a first liquid on the substrate while the substrate is at the first liquid dispensing position; (d) moving the substrate orientation device from the first liquid dispensing device to the second liquid dispensing device; (e) operating the substrate orientation device to move the substrate to a second liquid dispensing position oriented at an angle to first liquid dispensing position; and (f) at the second liquid dispensing device, dispensing a second liquid on the substrate while the substrate is at the second liquid dispensing position.

19. The liquid dispensing system of implementation 18, wherein, between any two of the steps (a)-(f), the operation is performed without removing the substrate from the substrate orientation device.

20. The liquid dispensing system of any of implementations 8-19, comprising a stage movable along one or more axes, wherein the substrate orientation device is mountable to the stage and movable therewith.

21. The liquid dispensing system of any of implementations 8-20 comprising a controller configured to control an operation comprising one of: moving the frame relative to the base; moving the substrate orientation device to and from the liquid dispensing device; moving the frame relative to the base, and moving the substrate orientation device to and from the liquid dispensing device; moving the frame relative to the base, and moving the substrate orientation device to and from the liquid dispensing device, wherein the substrate remains supported by the frame between the moving of the frame and the moving of the substrate orientation device.

22. The liquid dispensing system of any of implementations 8-21, comprising a controller configured to control an operation comprising at least one of: depositing droplets on the substrate while supported by the frame; depositing an array of droplets on an array of corresponding sites on the substrate while supported by the frame; applying a bulk liquid to the substrate while supported by the frame; depositing droplets on the substrate while supported by the frame, and applying a bulk liquid to the substrate while supported by the frame; depositing droplets on the substrate while supported by the frame, and applying a bulk liquid to the substrate while supported by the frame, wherein the substrate remains supported by the frame between the depositing of the droplets and the applying of the bulk liquid.

23. The liquid dispensing system of any of implementations 8-22, comprising a controller configured to control an operation comprising at least one of: moving the frame to a mounting position at which the substrate is mountable to the frame; moving the frame to an open flow cell position at which the frame, or at least the substrate while supported by the frame, is parallel with a flow cell; moving the frame to a closed flow cell position at which the substrate while supported by the frame at least partially closes a flow cell.

24. A method for dispensing liquid on a substrate, the method comprising: providing the substrate orientation device of any of the preceding implementations; mounting the substrate to the frame; moving the frame to the first position; moving the frame to the second position; and before or after moving the frame to the first position and to the second position, dispensing a liquid on the substrate.

25. A method for dispensing liquid on a substrate, the method comprising: providing a substrate orientation device comprising a base and a frame configured to support the substrate; mounting the substrate to the frame; moving the frame relative to the base to a first position at which the frame is substantially parallel with the base; moving the frame relative to the base to a second position at which the frame is oriented at an angle to the base; and before or after moving the frame to the first position and to the second position, dispensing a liquid on the substrate.

26. The method of implementation 25, comprising at least one of: moving the frame to an additional position oriented at an angle between the first position and the second position; moving the frame to an additional position at which the substrate is adjacent to a flow cell; moving the frame to an additional position, wherein the mounting of the substrate is done at the additional position; wherein the moving of the frame relative to the base comprises rotating the frame; linearly translating at least one of the base or the frame.

27. The method of implementation 25 or 26, comprising moving the frame to an open flow cell position at which the substrate is parallel to an open flow cell, and moving the frame to a closed flow cell position at which the substrate at least partially closes the flow cell.

28. The method of implementation 27, wherein the dispensing of the liquid is done at the closed flow cell position.

29. The method of any of implementations 25-28, wherein the dispensing of the liquid comprises dispensing a first liquid on the substrate and dispensing a second liquid on the substrate.

30. The method of implementation 29, comprising one of: wherein the dispensing of the first liquid comprises depositing a plurality of droplets on the substrate; wherein the dispensing of the second liquid comprises applying a bulk liquid to the substrate; wherein the dispensing of the first liquid comprises depositing a plurality of droplets on the substrate, and the dispensing of the second liquid comprises applying a bulk liquid to the substrate.

31. The method of implementation 29 or 30, wherein the first liquid is dispensed by a first liquid dispensing device and the second liquid is dispensed by a second liquid dispensing device.

32. The method of implementation 31, wherein the dispensing of the first liquid is done while the substrate is at a first liquid dispensing position and the substrate orientation device is at the first liquid dispensing device, and the method further comprises: moving the substrate orientation device from the first liquid dispensing device to the second liquid dispensing device; and moving the substrate to a second liquid dispensing position by moving the frame, wherein the dispensing of the second liquid is done while the substrate is at the second liquid dispensing position and the substrate orientation device is at the second liquid dispensing device.

33. The method of implementation 32, wherein the moving of the substrate orientation device is done between the dispensing of the first liquid and the dispensing of the second liquid, and is done without removing the substrate from the frame.

34. The method of implementation 31, comprising: (a) operating the substrate orientation device to move the substrate to a first liquid dispensing position; (b) moving the substrate orientation device to the first liquid dispensing device; (c) at the first liquid dispensing device, dispensing the first liquid on the substrate while the substrate is at a first liquid dispensing position; (d) moving the substrate orientation device from the first liquid dispensing device to the second liquid dispensing device; (e) operating the substrate orientation device to move the substrate to a second liquid dispensing position oriented at an angle to the first liquid dispensing position; and (f) at the second liquid dispensing device, dispensing a second liquid on the substrate while the substrate is at the second liquid dispensing position.

35. The method of implementation 34, wherein, between any two of the steps (a)-(f), the method is performed without removing the substrate from the substrate orientation device.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the system controller 700 schematically depicted in FIG. 6 or 7. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), application specific integrated circuits (ASICs), field-programmable gate array (FPGAs), etc. Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the system controller 700 schematically depicted in FIG. 6 or 7), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" or "in electrical communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A substrate orientation device for orienting a substrate configured as a solid support for liquid dispensing, the substrate orientation device comprising:

a base; and a frame configured to support the substrate and to move relative to the base to a first position and to a second position, wherein:

at the first position, the substrate while supported by the frame is substantially parallel with the base; and at the second position, the substrate while supported by the frame is oriented at an angle to the base.

2. The substrate orientation device of claim 1, comprising at least one of:

the frame is movable to a mounting position at which the substrate is mountable to the frame;

the frame is movable to an open flow cell position at which the frame, or at least the substrate while supported by the frame, is adjacent to a flow cell;

the frame is movable to a closed flow cell position at which the substrate while supported by the frame at least partially closes a flow cell;

the frame is movable from an open flow cell position to a closed flow cell position, wherein: at the open flow cell position, the frame, or at least the substrate while supported by the frame, is adjacent to a flow cell; and at the closed flow cell position, the substrate while supported by the frame at least partially closes the flow cell.

3. The substrate orientation device of claim 1, comprising an actuator configured to drive movement of the frame relative to the base.

4. A liquid dispensing system, comprising:

the substrate orientation device of claim 1; and a liquid dispensing device configured to dispense a liquid on the substrate while the substrate is supported by the frame.

5. The liquid dispensing system of claim 4, wherein the liquid dispensing device comprises a flow cell configured to receive the substrate while the substrate is supported by the frame.

6. The liquid dispensing system of claim 4, wherein the liquid dispensing device is configured to deposit droplets on the substrate while the substrate is supported by the frame.

7. The liquid dispensing system of claim 4, wherein the liquid dispensing device is configured to apply a bulk liquid to the substrate while the substrate is supported by the frame.

8. The liquid dispensing system of claim 4, wherein the liquid dispensing device is a first liquid dispensing device configured to dispense a first liquid on the substrate while the substrate is supported by the frame, and further comprising a second liquid dispensing device configured to dispense a second liquid on the substrate while the substrate is supported by the frame.

9. The liquid dispensing system of claim 8, wherein the first liquid dispensing device is configured to deposit a plurality of droplets on the substrate as the first liquid, and the second liquid dispensing device is configured to apply a bulk liquid to the substrate as the second liquid.

10. The liquid dispensing system of claim 8, comprising a stage configured to move the substrate orientation device between the first liquid dispensing device and the second liquid dispensing device.

11. The liquid dispensing system of claim 8, comprising a controller configured to control an operation comprising:

(a) operating the substrate orientation device to move the substrate, while the substrate is supported by the substrate orientation device, to a first liquid dispensing position;

(b) moving the substrate orientation device to the first liquid dispensing device;

(c) at the first liquid dispensing device, dispensing a first liquid on the substrate while the substrate is at the first liquid dispensing position;

(d) moving the substrate orientation device from the first liquid dispensing device to the second liquid dispensing device;

(e) operating the substrate orientation device to move the substrate to a second liquid dispensing position oriented at an angle to first liquid dispensing position; and (f) at the second liquid dispensing device, dispensing a second liquid on the substrate while the substrate is at the second liquid dispensing position.

12. The liquid dispensing system of claim 11, wherein, between any two of the steps (a)-(f), the operation is performed without removing the substrate from the substrate orientation device.

13. The liquid dispensing system of claim 4 comprising a controller configured to control an operation comprising one of:

moving the frame relative to the base;

moving the substrate orientation device to and from the liquid dispensing device;

moving the frame relative to the base, and moving the substrate orientation device to and from the liquid dispensing device;

moving the frame relative to the base, and moving the substrate orientation device to and from the liquid dispensing device, wherein the substrate remains supported by the frame between the moving of the frame and the moving of the substrate orientation device.

14. The liquid dispensing system of claim 4, comprising a controller configured to control an operation comprising at least one of:

depositing droplets on the substrate while supported by the frame;

depositing an array of droplets on an array of corresponding sites on the substrate while supported by the frame;

applying a bulk liquid to the substrate while supported by the frame;

depositing droplets on the substrate while supported by the frame, and applying a bulk liquid to the substrate while supported by the frame;

depositing droplets on the substrate while supported by the frame, and applying a bulk liquid to the substrate while supported by the frame, wherein the substrate remains supported by the frame between the depositing of the droplets and the applying of the bulk liquid.

15. The liquid dispensing system of claim 4, comprising a controller configured to control an operation comprising at least one of:

moving the frame to a mounting position at which the substrate is mountable to the frame;

moving the frame to an open flow cell position at which the frame, or at least the substrate while supported by the frame, is parallel with a flow cell;

moving the frame to a closed flow cell position at which the substrate while supported by the frame at least partially closes a flow cell.

16. A method for dispensing liquid on a substrate, the method comprising:

providing a substrate orientation device comprising a base and a frame configured to support the substrate;

mounting the substrate to the frame;

moving the frame relative to the base to a first position at which the frame is substantially parallel with the base;

moving the frame relative to the base to a second position at which the frame is oriented at an angle to the base; and before or after moving the frame to the first position and to the second position, dispensing a liquid on the substrate.

17. The method of claim 16, wherein the dispensing of the liquid comprises dispensing a first liquid on the substrate and dispensing a second liquid on the substrate.

18. The method of claim 17, wherein the first liquid is dispensed by a first liquid dispensing device and the second liquid is dispensed by a second liquid dispensing device.

19. The method of claim 18, wherein the dispensing of the first liquid is done while the substrate is at a first liquid dispensing position and the substrate orientation device is at the first liquid dispensing device, and the method further comprises:

moving the substrate orientation device from the first liquid dispensing device to the second liquid dispensing device; and moving the substrate to a second liquid dispensing position by moving the frame, wherein the dispensing of the second liquid is done while the substrate is at the second liquid dispensing position and the substrate orientation device is at the second liquid dispensing device.

20. The method of claim 19, wherein the moving of the substrate orientation device is done between the dispensing of the first liquid and the dispensing of the second liquid, and is done without removing the substrate from the frame.

* * * * *